United States Patent
Suzuki

(10) Patent No.: US 8,629,996 B2
(45) Date of Patent: Jan. 14, 2014

(54) PRINTING APPARATUS AND PRINTING METHOD

(75) Inventor: Takumi Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 13/311,883

(22) Filed: Dec. 6, 2011

(65) Prior Publication Data

US 2012/0147407 A1    Jun. 14, 2012

(30) Foreign Application Priority Data

Dec. 13, 2010  (JP) .................. 2010-276832
Apr. 8, 2011   (JP) .................. 2011-086752

(51) Int. Cl.
*G06F 15/00* (2006.01)

(52) U.S. Cl.
USPC ....................................... 358/1.13

(58) Field of Classification Search
USPC ....................................... 358/1.13
See application file for complete search history.

(56) References Cited

U.S. PATENT DOCUMENTS

| 5,677,725 | A | 10/1997 | Honbo et al. |
| 7,859,720 | B2 | 12/2010 | Yokoyama et al. |
| 2008/0112012 | A1 | 5/2008 | Yokoyama et al. |
| 2009/0021543 | A1* | 1/2009 | Baba .................. 347/9 |

FOREIGN PATENT DOCUMENTS

| JP | 2008-148291 A | 6/2008 |
| JP | 2009-040043 A | 2/2009 |

* cited by examiner

*Primary Examiner* — Saeid Ebrahimi Dehkordy
(74) *Attorney, Agent, or Firm* — Fitzpatrick, Cella, Harper & Scinto

(57) ABSTRACT

A printing apparatus comprises a movement unit which moves a carriage incorporating a print head along a carriage shaft arranged in a main scanning direction, and a conveyance unit which conveys a printing medium in a sub-scanning direction perpendicular to the main scanning direction. The printing apparatus stores image data. The image data is divided into a plurality of first image data in the main scanning direction and the sub-scanning direction, and is read out. Predetermined image processing is executed based on the first image data and first image data adjacent to the first image data in the sub-scanning direction. Second image data is extracted, based on information about a deflection of the carriage shaft in the sub-scanning direction, from the first image data for which the image processing has been executed. The extracted second image data is transferred to the print head.

12 Claims, 22 Drawing Sheets

F I G. 5A

| dot | 1 | 2 | 3 | 4 | ............ | 72000 |
|---|---|---|---|---|---|---|
| CORRECTION AMOUNT | 0 | +1 | +2 | +3 | ............ | −10 |

F I G. 5B

| BLOCK | 1-1 | 1-2 | 1-3 | 1-4 | ............ | 1-282 |
|---|---|---|---|---|---|---|
| CORRECTION AMOUNT | 0 | +1 | +1 | −1 | ............ | −1 |

FIG. 6A
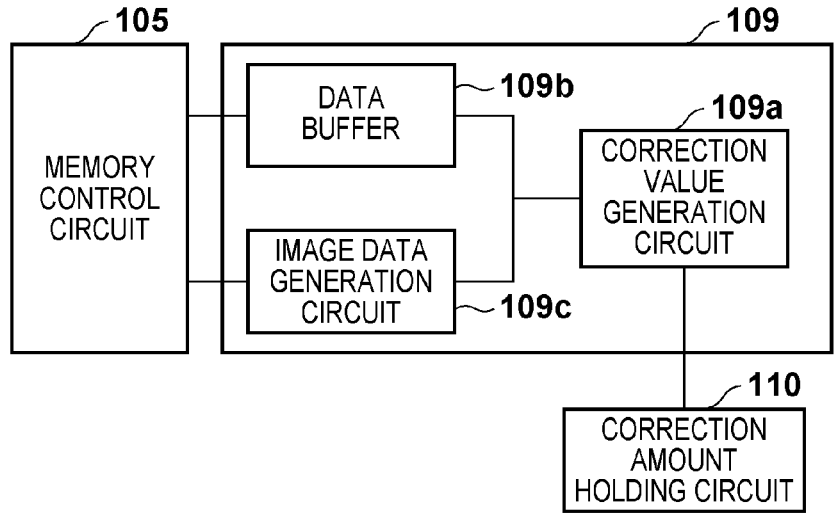
FIG. 6B
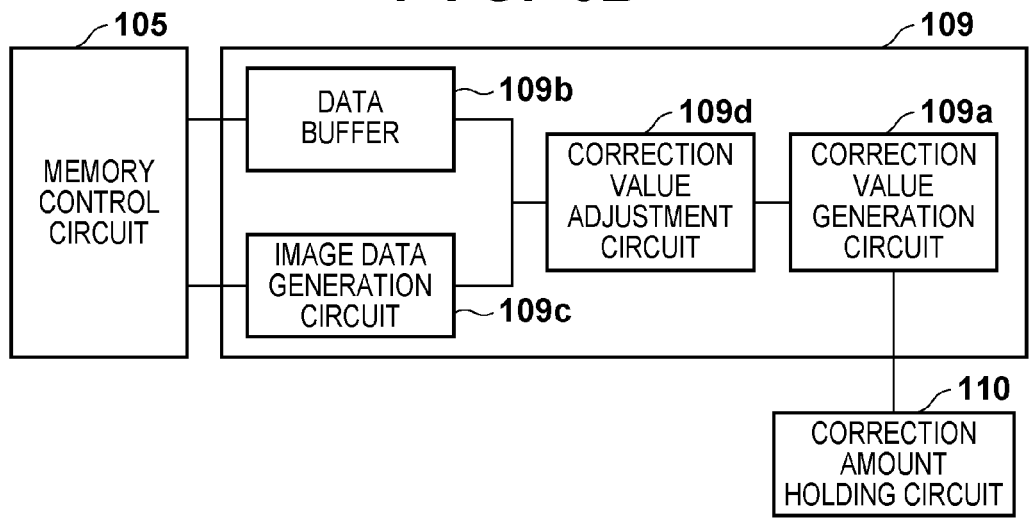
FIG. 7
| BLOCK | 1-1 | 1-2 | 1-3 | 1-4 | ............ |
|---|---|---|---|---|---|
| TOTAL CORRECTION AMOUNT | 0 | +1 | +2 | +1 | ............ |

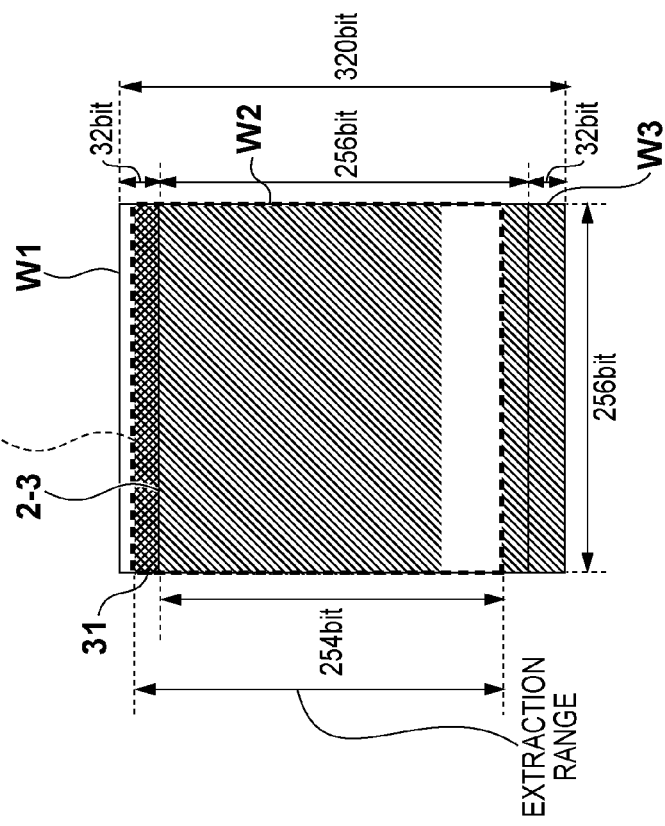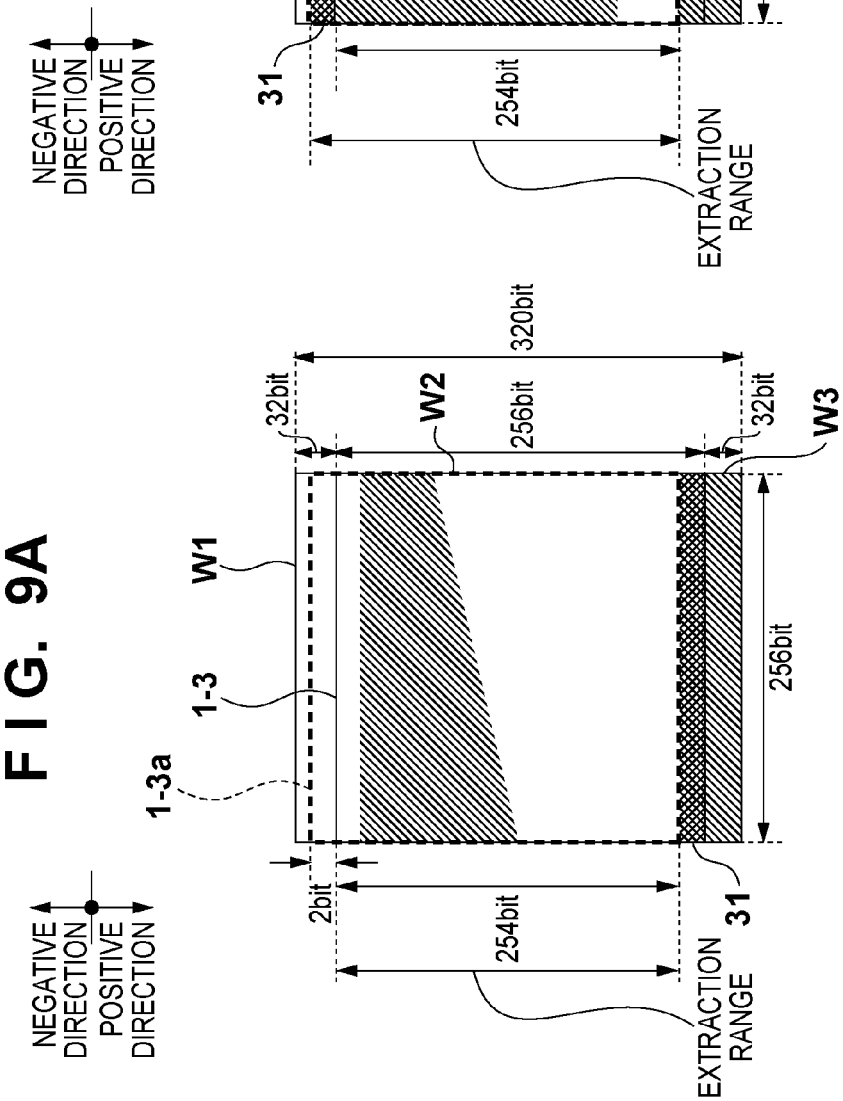

F I G. 12
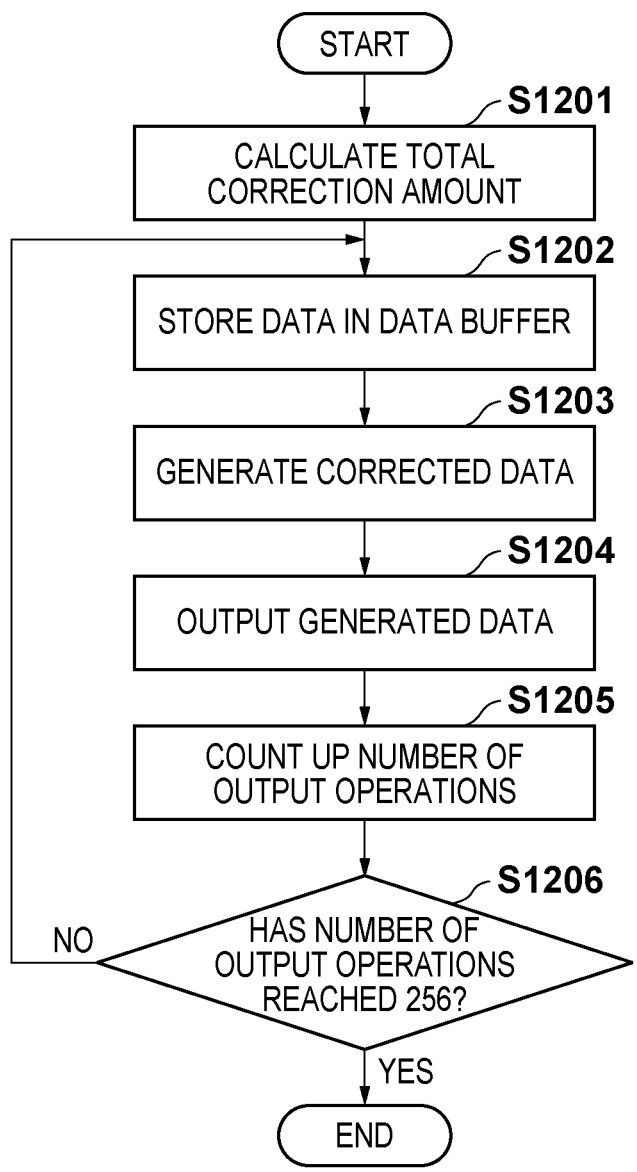

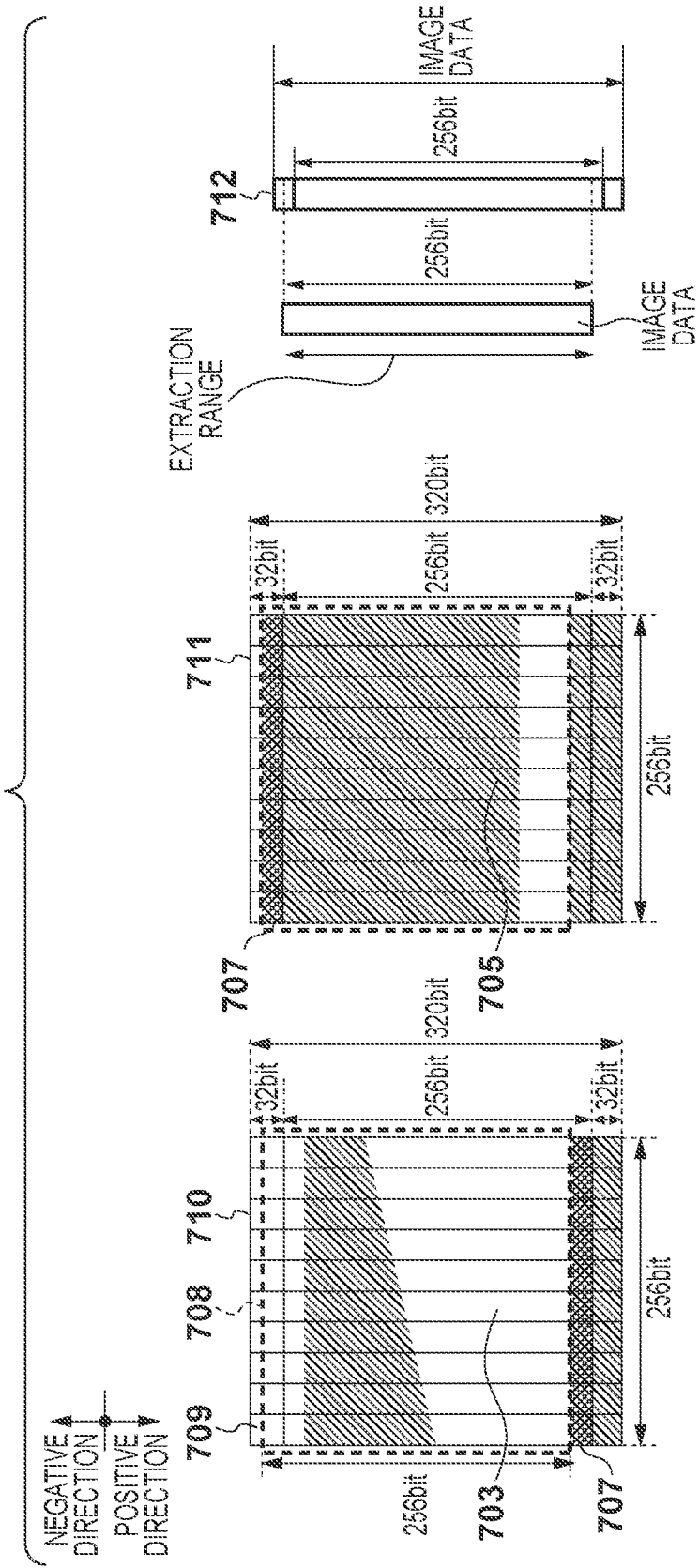

FIG. 25
[ IDEAL PRINT IMAGE ]
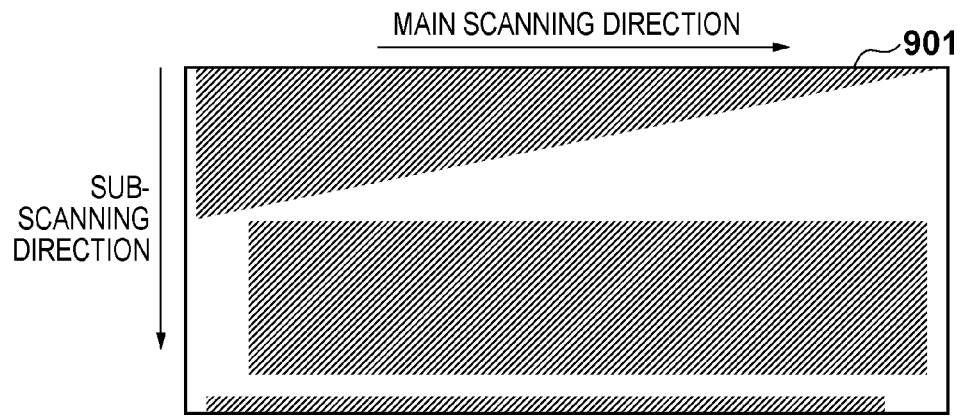
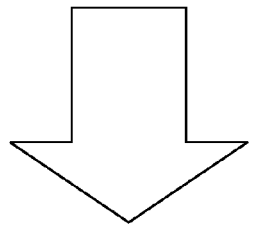
[ PRINT IMAGE ON PAPER SHEET (AFTER DISCHARGING INK) ]
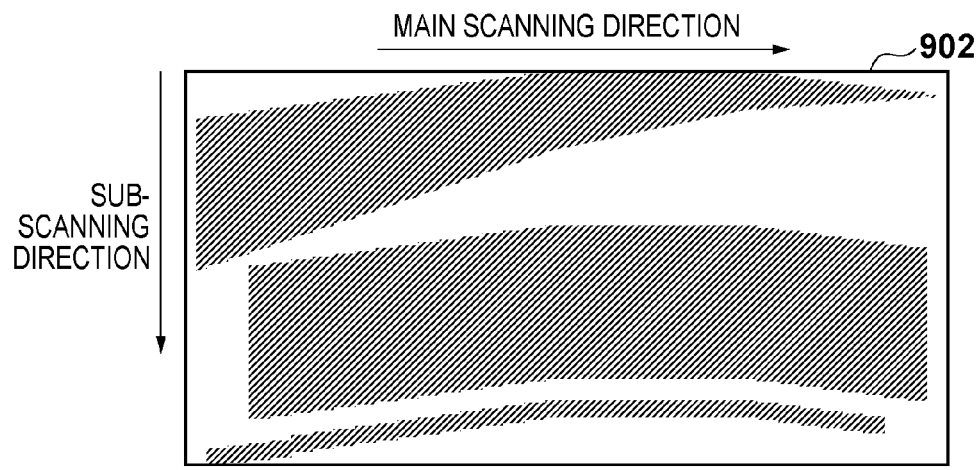

PRINTING APPARATUS AND PRINTING METHOD

BACKGROUND OF THE INVENTION

1. Field of the Invention

The present invention relates to a printing apparatus for forming a print image on a printing medium and a printing method.

2. Description of the Related Art

An inkjet printer as one type of printing apparatus forms a print image on a printing medium by discharging ink.

An inkjet printer has a print head for discharging ink, a carriage including the print head, a drive unit for reciprocating the carriage in the main scanning direction, and a conveyance unit for conveying a printing medium in the sub-scanning direction almost perpendicular to the main scanning direction. Note that the print head has a plurality of nozzles each including a plurality of ink discharge orifices.

In a printing apparatus with the above arrangement, due to deflection of a carriage shaft which serves as a guide when the carriage reciprocates or the like, a print image shifts in a direction parallel to the sub-scanning direction with respect to an image based on image data.

FIG. 25 is a view showing a case in which an image is printed on a printing medium (for example, a printing paper sheet) using image data by discharging ink from a print head. It is ideal to print an image 901 shown in FIG. 25. If, however, a carriage shaft is deflected, ink droplet adhering positions on a printing medium actually shifts in the sub-scanning direction, and an image 902 shown in FIG. 25 is thus printed.

To avoid this, there is provided a method of limiting nozzles to be used among a plurality of nozzles, and a method of printing while shifting a printing position for each color in accordance with a shift amount of the printing position. Furthermore, Japanese Patent Laid-Open No. 2009-040043 discloses a method of switching between the two above-described methods depending on the condition involved.

In the above-described method of limiting nozzles to be used, a time taken to form a print image becomes long.

Even if the method of shifting a printing position for each color in accordance with a shift amount of the printing position is used, it is impossible to sufficiently correct the shift of the print image, thereby not allowing to obtain a high quality print image.

SUMMARY OF THE INVENTION

An aspect of the present invention is to eliminate the above-mentioned problems with conventional technology. The present invention provides a printing apparatus which enables obtaining a high-quality print image without prolonging a time taken to form the print image and a printing method.

The present invention in its first aspect provides a printing apparatus comprising: a movement unit configured to move a carriage incorporating a print head along a carriage shaft arranged in a main scanning direction; a conveyance unit configured to convey a printing medium in a sub-scanning direction perpendicular to the main scanning direction; a storage unit configured to store image data; a reading unit configured to read first image data from the storage unit, wherein the image data stored by the storage unit is divided into a plurality of the first image data in the main scanning direction and the sub-scanning direction; an image processing unit configured to execute predetermined image processing based on the first image data and first image data adjacent to the first image data in the sub-scanning direction; an extraction unit configured to extract, based on information about a deflection of the carriage shaft in the sub-scanning direction, second image data from the first image data for which the image processing unit has executed the image processing; and a transfer unit configured to transfer the second image data extracted by the extraction unit to the print head.

The present invention in its second aspect provides a printing method executed by a printing apparatus which includes a movement unit for moving a carriage incorporating a print head along a carriage shaft arranged in a main scanning direction, and a conveyance unit for conveying a printing medium in a sub-scanning direction perpendicular to the main scanning direction, the method comprising: a storage step of storing first image data corresponding to each of a plurality of regions obtained by dividing image data in the main scanning direction and the sub-scanning direction; a reading step of reading first image data from the storage unit, wherein the image data stored in the storage step is divided into a plurality of the first image data in the main scanning direction and the sub-scanning direction; an image processing step of executing predetermined image processing based on the first image data and first image data adjacent to the first image data in the sub-scanning direction; an extraction step of extracting, based on information about a deflection of the carriage shaft in the sub-scanning direction, second image data from the first image data for which the image processing has been executed in the image processing step; and a transfer step of transferring the second image data extracted in the extraction step to the print head.

According to the present invention, to correct a shift of a print image with respect to an image based on image data, it is not necessary to limit nozzles to be used. Since the shift of the print image is corrected based on a correction amount according to a deflection amount of a carriage shaft, it is possible to perform high accuracy correction.

It is, therefore, possible to obtain a high quality print image without prolonging a time taken to form the print image.

Further features of the present invention will become apparent from the following description of exemplary embodiments with reference to the attached drawings.

BRIEF DESCRIPTION OF THE DRAWINGS

FIG. 5A is a table when a correction amount is set every 1 dot in the main scanning direction;

FIG. 5B is a table when a correction amount is set every 256 dots in the main scanning direction;

FIG. 6A is a block diagram showing an arrangement example of an image correction processing circuit shown in FIG. 2;

FIG. 6B is a block diagram showing another arrangement example of the image correction processing circuit;

FIG. 7 is a table showing examples of a total correction amount calculated by a total correction amount calculation circuit shown in FIG. 6A;

FIGS. 9A and 9B are views for explaining an operation of generating correction data by the image data generation circuit shown in FIG. 6A;

FIG. 12 is a flowchart for explaining details of an operation of generating correction data according to an operation procedure shown in FIG. 11;

FIG. 22A is a position information-correction amount table corresponding to blocks shown in FIG. 21;

FIG. 22B is a view schematically showing a case in which image data obtained by executing image processing for blocks 703 and 705 is stored in an SRAM 106;

FIG. 25 is a view showing image printing when a conventional technique is applied.

DESCRIPTION OF THE EMBODIMENTS

Figure 1:
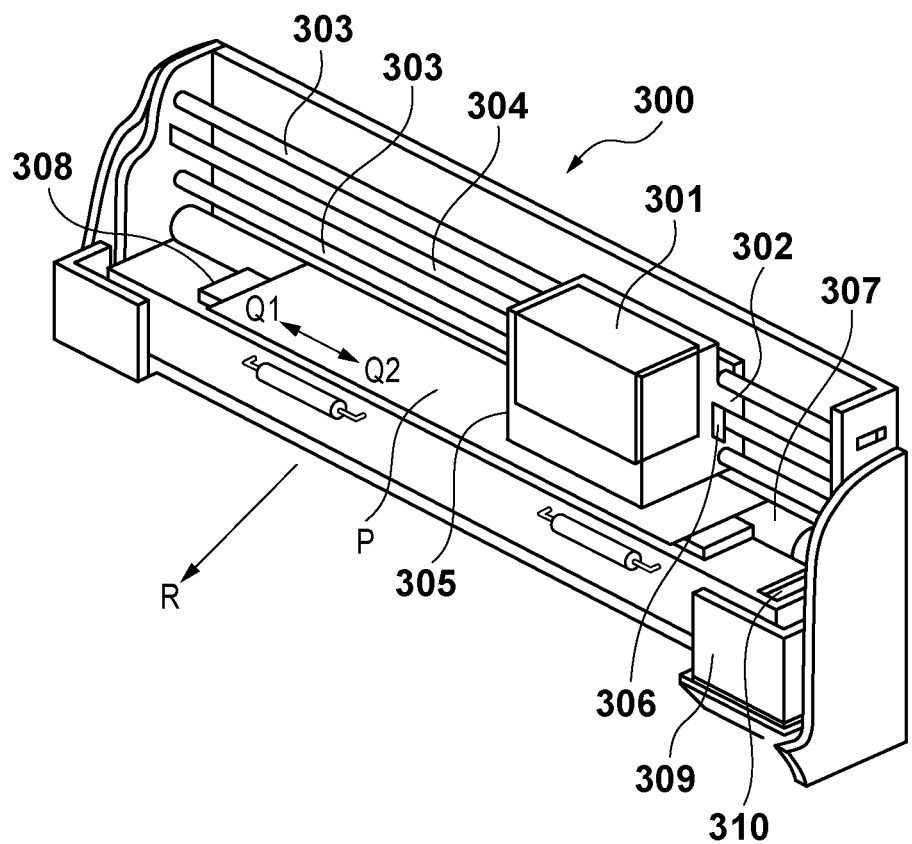
FIG. 1 is a perspective view mainly showing the schematic arrangement of a printing unit of an inkjet printing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals denote the same components, and a repetitive description thereof will be omitted.

In this specification, "printing" (to also be referred to as "print" hereinafter) not only indicates a case in which significant information such as characters and graphics is formed but also widely indicates a case in which, regardless of whether information is significant or insignificant, images, designs, patterns, and the like are formed on a printing medium or a medium is processed. Furthermore, it does not matter whether the information is overt such that the user can visually perceive it.

"Printing medium" includes not only a paper sheet used in a general printing apparatus but also a wide variety of media on which ink can adhere, such as a cloth, a plastic film, a metal plate, glass, ceramics, wood, and leather.

"Ink" should be interpreted in a broad sense as the above definition of "printing", and indicates a liquid used to form an image, a design, a pattern, and the like, or to process a printing medium, or used for ink processing by being discharged on the printing medium. The ink processing includes, for example, solidification or insolubilization of ink color materials adhering on a printing medium.

"Printing component" or "printing element" collectively indicates a discharge orifices (nozzle) or a fluid path communicating with it, and an element for generating energy used to discharge ink, unless otherwise specified.

FIG. 1 is a perspective view showing the schematic arrangement of an inkjet printing apparatus including a representative inkjet print head according to the present invention.

As shown in FIG. 1, a carriage 302 of an inkjet printing apparatus (to be referred to as a printing apparatus hereinafter) 300 includes an inkjet print head (to be referred to as a print head hereinafter) 301 having a plurality of ink discharge orifices (to be referred to as nozzles hereinafter) for discharging ink droplets. The carriage 302 scans when carriage shafts 303 guide it in the directions (the main scanning direction) indicated by arrows Q1 and Q2. In the scan operation, the carriage 302 prints by discharging ink from the print head 301 on a printing medium. When the carriage 302 moves, it reads slits which are provided on an encoder film 304 at predetermined intervals, detects the position of the print head 301, and generates a timing of printing by the print head using the detected position. An optical sensor 305 arranged on a side surface of the carriage 302 is used to measure the distance between paper sheets for each carriage scan.

When a print operation starts, a printing medium P such as a printing paper sheet is fed to a feed position by a feed roller (not shown), is conveyed by a conveyance roller 307 to a predetermined print start position, and is supported there from underneath by a platen 308. While the carriage 302 is driven by a carriage motor (not shown) to reciprocate in a scan region including a print region along the main scanning directions indicated by the arrows Q1 and Q2, the print head 301 discharges ink from the ink discharge orifices on the printing medium P positioned below them. With this operation, printing of the printing medium P for one scan is done. When one main scan ends, the printing medium P is conveyed by a given amount in the sub-scanning direction which is indicated by an arrow R and perpendicular to the main scanning direction, and is prepared for the next scan printing.

By repeating printing by the print head in the main scanning direction and conveyance of the print medium in the sub-scanning direction, printing is done on the entire surface of the print medium P. In this case, the optical sensor 305 of the carriage 302 measures the distance between paper sheets, and an encoder sensor 306 of the carriage 302 reads a slit on the encoder film 304.

The printing apparatus 300 is provided with a maintenance unit 309 of the print head 301, which controls print head capping by a head cap 310, cleaning of the ink discharge surface of the print head, recovery of the print head, and the like. By capping the print head 301, the nozzle formation surface of the print head 301 is sealed off, thereby preventing ink from drying.

Figure 2:
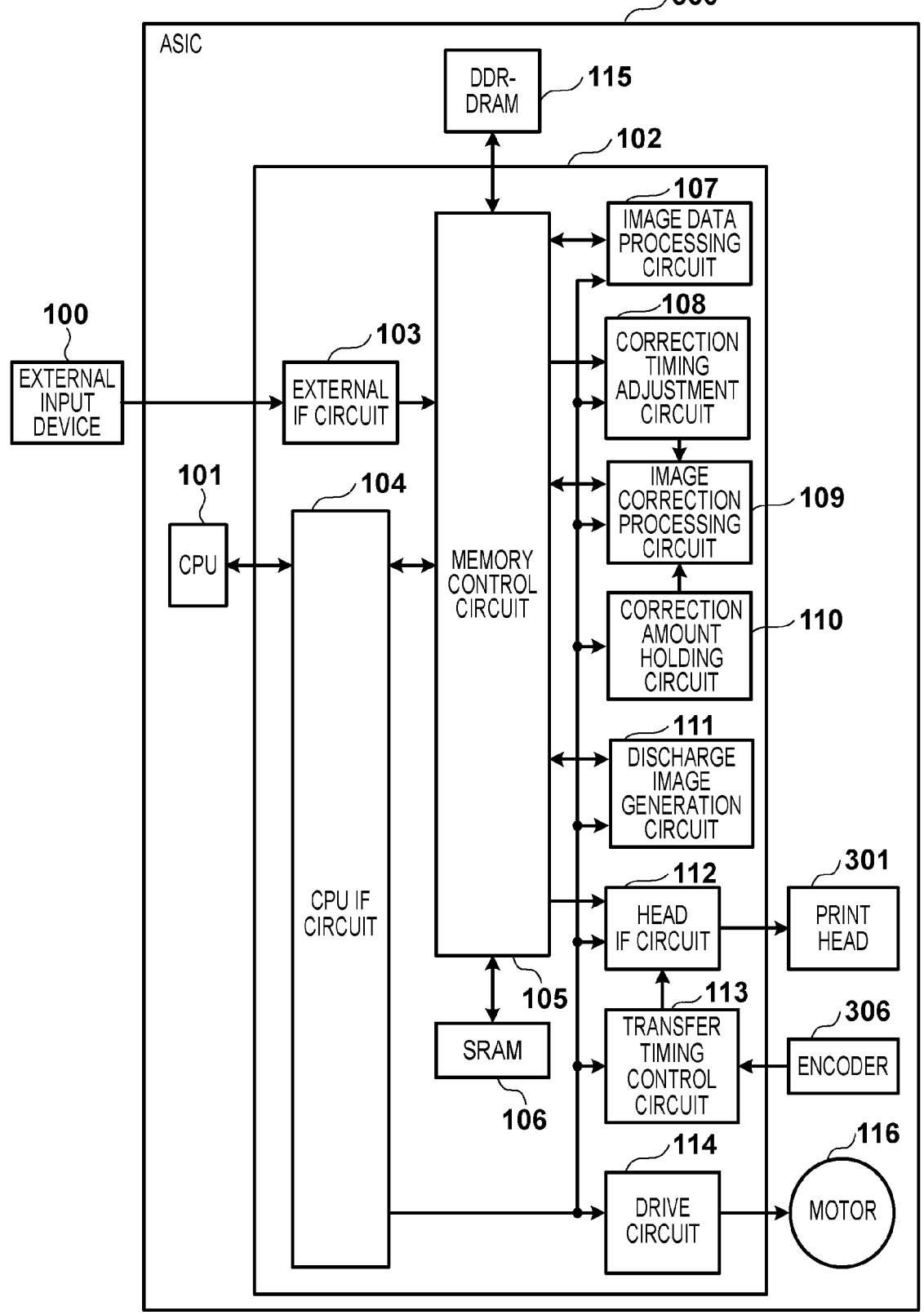
FIG. 2 is a block diagram showing the control arrangement of the inkjet printing apparatus shown in FIG. 1.

FIG. 2 is a block diagram showing the control arrangement of the printing apparatus shown in FIG. 1.

The printing apparatus 300 is connected with an external input device 100 such as a PC and hard disk drive (HDD). The printing apparatus 300 includes a CPU 101 for controlling the apparatus as a whole, and an ASIC 102 for controlling hardware associated with a print operation specific to the printing apparatus. The ASIC 102 includes an external interface (IF) circuit 103, a CPU interface (IF) circuit 104, a memory control circuit 105, an SRAM 106, and an image data processing circuit 107. The ASIC 102 also includes a correction timing adjustment circuit 108, an image correction processing circuit 109, a correction amount holding circuit 110, a discharge image generation circuit 111, a head interface (IF) circuit 112, a transfer timing control circuit 113, and a drive circuit 114. The SRAM 106 may be an SRAM group including a plurality of SRAMs.

The operation of the internal circuits of the ASIC 102 will be described next.

The external interface circuit 103 is connected with the external input device. The external interface circuit includes an interface circuit connected with the external input device 100, such as a USB interface circuit, LAN interface circuit, and IDE interface circuit. The CPU interface circuit 104 is connected with the CPU 101, and controls communication with each block via the CPU 101.

The memory control circuit 105 is connected with the external IF circuit 103, the SRAM 106, the image data processing circuit 107, the correction timing adjustment circuit 108, the image correction processing circuit 109, the discharge image generation circuit 111, the head interface circuit 112, and a DDR-DRAM 115. The memory control circuit 105 transfers, to the SRAM 106, image data input from the external input device 100. The memory control circuit 105 also controls a data write operation/data read operation in/from the SRAM 106 and DDR-DRAM 115 in a predetermined size (for example 256 bits×256 bits, 32 bits×256 bits, 320 bits× 256 bits, 256 bits×1 bits).

The SRAM 106 is used as a work buffer, in which print image data is divided into blocks each having a given size, and then stored. The number of SRAMs is equal to that of ink colors or that of nozzles. In this example, assume that the data divided into blocks the number of which is equal to that of ink colors. To execute image processing for a given block, image data adjacent on the upper, lower, right, and left sides of the block are also needed. Therefore, assume that the SRAM 106 stores image data having 256 bits×256 bits or larger.

The image data processing circuit 107 executes image processing for image data stored in the SRAM 106. The image processing includes boundary processing, edge processing, HV conversion processing, smoothing processing, and non-discharge interpolation processing but is not limited to them.

The correction timing adjustment circuit 108 generates an execution timing of the image correction processing circuit 109. The correction timing adjustment circuit 108 then outputs, to the image correction processing circuit 109, an offset enable signal indicating that an offset is valid, and a correction timing change signal indicating completion of image data transfer for a reference column.

Based on the correction timing change signal and offset enable signal output from the correction timing adjustment circuit 108, the image correction processing circuit 109 executes image correction processing for image data using a correction amount transferred from the correction amount holding circuit 110. After the last processing executed by the image data processing circuit 107, for example, this image correction processing is executed. The internal arrangement and processing of the correction timing adjustment circuit 108 and image correction processing circuit 109 will be described later with reference to the accompanying drawings.

The discharge image generation circuit 111 converts the image data having undergone image processing into data (to be referred to as discharge image data) in a format according to the nozzles of the print head 301. The transfer timing control circuit 113 generates a transfer timing signal of a signal input from the encoder sensor 306 by multiplying the signal. The head interface circuit 112 transfers the discharge image data to the print head 301 at a timing indicated by the transfer timing signal. The DDR-DRAM 115 is used to hold data processed by the ASIC 102. The drive circuit 114 drives a motor 116, and controls a sensor (not shown).

The correction timing adjustment circuit 108 shown in FIG. 2 will be explained in the third embodiment.

An overview of the functions of the printing apparatus according to this embodiment will be described.

Figure 3A:
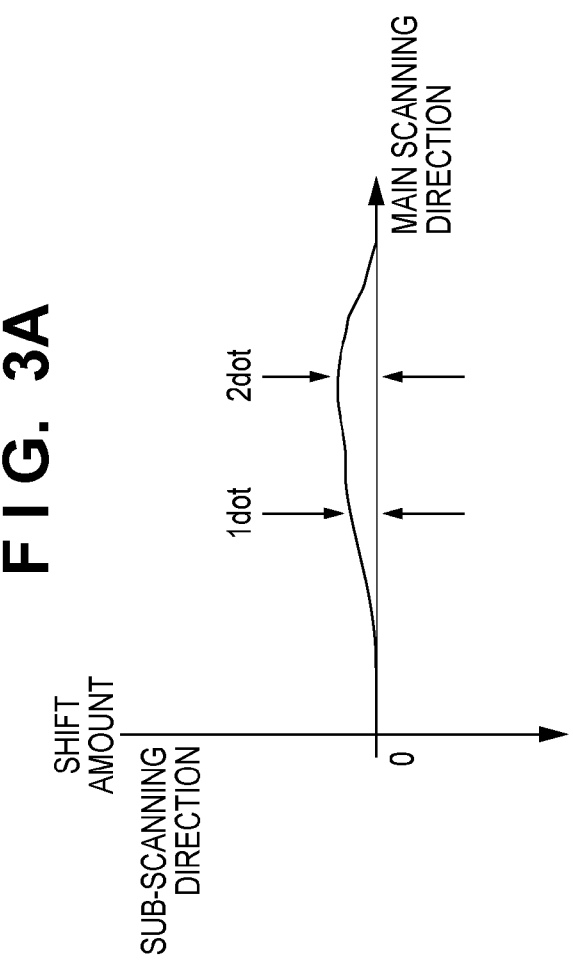
FIG. 3A is a view showing a shift amount due to deflection of a carriage shaft.
Figure 3D:
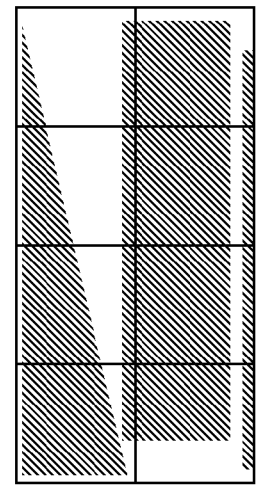
FIG. 3D is a view showing an example of a print image formed based on the image data shown in FIG. 3C.
Figure 3C:
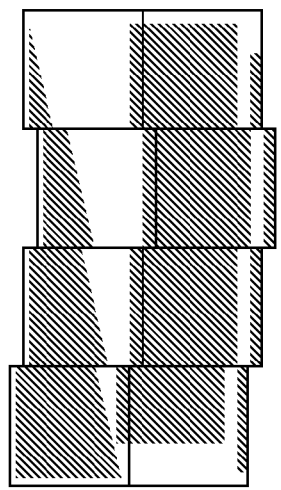
FIG. 3C is a view showing an image of image data which has been corrected according to the shift amount shown in FIG. 3A.
Figure 3B:
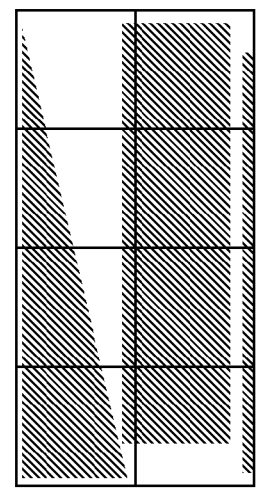
FIG. 3B is a view showing an image of image data.

FIGS. 3A to 3D are views for explaining an overview of the functions of the printing apparatus according to this embodiment. FIG. 3A is a view showing a shift amount in the sub-scanning direction due to deflection of a carriage shaft. FIG. 3B is a view showing an image of image data. FIG. 3C is a view showing an image of image data which has been corrected according to the shift amount shown in FIG. 3A. FIG. 3D is a view showing an example of a print image formed based on the image data shown in FIG. 3C. As shown in FIG. 3A, in a graph in which the ordinate represents the shift amount in the sub-scanning direction and the abscissa represents the main scanning direction, the shift amount forms a convex shape. The shift amount at reference point "0" is 0 dot but there is a shift as shown in FIG. 3A. In this example, the maximum shift is 2 dots.

If the carriage shaft is deflected, a print image shifts in a direction parallel to the sub-scanning direction according to the deflection amount, as shown in, for example, an image 902 of FIG. 25.

To avoid the print image from shifting, the printing apparatus of the present invention stores a correction amount corresponding to the deflection amount of the carriage shaft. A correction amount is set according to the deflection amount of the carriage shaft in the direction parallel to the sub-scanning direction, and is used to correct a shift of the print image in the direction parallel to the sub-scanning direction with respect to an image based on the image data. As shown in FIG. 3A, the deflection amount of the carriage shaft changes depending on a position in the main scanning direction. The printing apparatus of the present invention stores a correction amount set per predetermined unit in the main scanning direction.

The printing apparatus of the present invention corrects image data according to a correction amount. FIG. 3C shows an image of image data corrected according to a correction amount.

The print image shown in FIG. 3D is formed using the corrected image data shown in FIG. 3C.

When the images in FIGS. 3B and 3D are compared, it is found that they are similar. As described above, the printing apparatus of the present invention has a function capable of avoiding a print image from shifting in the direction parallel to the sub-scanning direction with respect to an image based on image data by correcting image data according to a correction amount.

Note that there is a method of detecting the deflection amount of the carriage shaft by discharging ink upon shipping from a factory, or a method of detecting the deflection amount of the carriage shaft using an optical sensor.

The deflection amount of the carriage shaft is an amount unique to an individual carriage shaft. Detection of the deflection amount of the carriage shaft needs to be done only once upon shipping from a factory. In consideration of the influence of a change over time, however, it is desirable to be able to detect the deflection amount by user operation.

First Embodiment

Figure 4A:
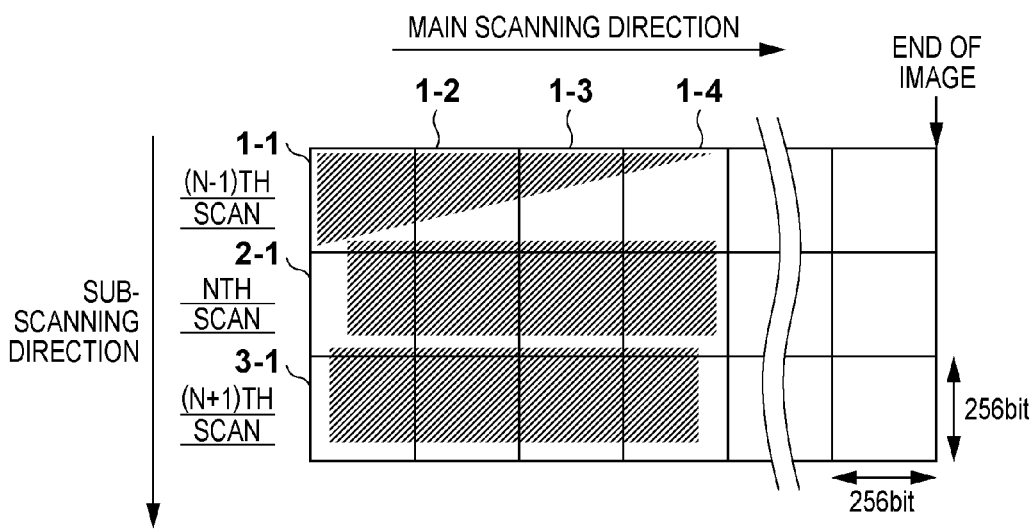
FIG. 4A is a view showing an image of image data.
Figure 4B:
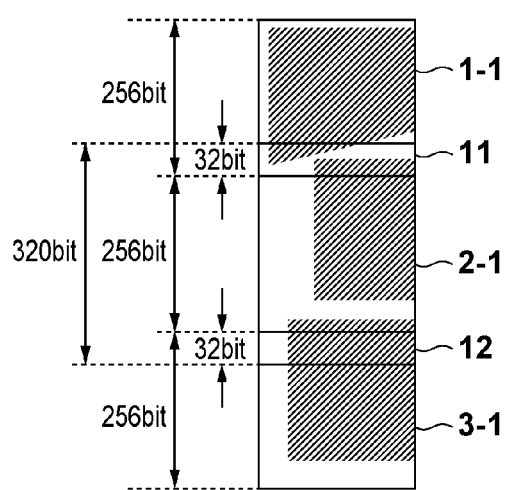
FIG. 4B is a view showing an image of data necessary for image processing.

FIGS. 4A and 4B are views for explaining the image processing executed by the image data processing circuit 107 shown in FIG. 2. FIG. 4A shows a case in which image data is divided into M data blocks (blocks 1-1 to 1-M) in the main scanning direction, and divided into a plurality of data blocks (blocks 1-1 to 3-1) in the sub-scanning direction, and each divided data block corresponds to a scan. For example, the block 1-1 indicates data printed by the (N−1)th scan; the block 2-1, data printed by the Nth scan; and the block 3-1, data printed by the (N+1)th scan. FIG. 4B is a view showing data amount of image data in the sub-scanning direction which is necessary for image processing.

The image data processing circuit 107 executes image processing for a plurality of divided image data obtained by dividing the image data in the main scanning direction and the sub-scanning direction as shown in FIG. 4A. The divided image data has a size of 256 bits continuous in the sub-scanning direction and 256 bits continuous in the main scanning direction. 1 bit in the sub-scanning direction or the main scanning direction corresponds to 1 dot.

Note that an expression "X bits continuous in the sub-scanning direction and Y bits continuous in the main scanning direction" is represented by "X bits×Y bits" hereinafter. Assume that a simple expression "Z bits" indicates Z bits continuous in the sub-scanning direction.

In FIG. 4A, assume that each of the plurality of divided image data having a size of (256 bits×256 bits) is placed at the position corresponding to one of the plurality of blocks.

In the example shown in FIG. 4A, image processing is first executed for the divided image data for the (N−1)th scan. Then, image processing is executed for the divided image data for the Nth scan.

By executing image processing for each of the plurality of the divided image data, discharge image data for forming a print image is generated. Note that it is possible to switch between colors in each block or each scan. In this example, colors are switched in each block.

To perform image processing for each divided image data, parts of the divided image data adjacent to the divided image data in the sub-scanning direction are used. In the example shown in FIG. 4B, to execute image processing for the divided image data of the block 2-1, data 11 as part of the divided image data of the block 1-1 and data 12 as part of the divided image data of the block 3-1 are used. The data size of each of the data 11 or 12 is (32 bits×256 bits).

That is, to execute image processing for the divided image data of the block 2-1, data having a size of (320 bits×256 bits) including the data 11 and 12 is required.

To perform image processing, therefore, an area having a size of 320 bits in the sub-scanning direction and 256 bits in the main scanning direction is assigned to the SRAM 106, and the image data is stored in the area.

For example, data (11 bits×256 bits) on the block 1-1 side of the data 11 and data (11 bits×256 bits) on the block 3-1 side of the data 12 in FIG. 4B are not used for edge processing.

Data (21 bits×256 bits) on the block 2-1 side of the data 11 and data (21 bits×256 bits) on the block 2-1 side of the data 12 are, therefore, used to perform the edge processing for the block 2-1.

In this embodiment, the image data processing circuit 107 executes image processing for extended divided image data obtained by combining divided image data with parts of divided image data adjacent to the divided image data in the sub-scanning direction. If the size of the divided image data is (256 bits×256 bits), the size of the extended divided image data is ((256+N) bits×256 bits (N is an integer of 1 or larger)).

The edge processing has been explained as an example of image processing. The size of the extended divided image data changes depending on the type of image processing to be executed. Along with this, a correction amount range stored in the correction amount holding circuit 110 (to be described later) also changes.

Referring back to FIG. 2, the correction amount holding circuit 110 has a correction amount table, and stores the above-described correction amount in the correction amount table. The correction amount holding circuit 110 outputs correction amount information indicating the stored correction amount to the image correction processing circuit 109.

FIGS. 5A and 5B are tables each showing a structure example of the correction amount table of the correction amount holding circuit 110 shown in FIG. 2. FIG. 5A is a table where a correction amount is set every 1 dot in the main scanning direction. FIG. 5B is a table when a correction amount is set every 256 dots in the main scanning direction.

Note that since the deflection amount of the carriage shaft at a given position in the main scanning direction can be considered to be constant, it is possible to basically set correction amounts in the (N−1)th and Nth scans to be equal to each other.

Assume that the correction amount ranges from −14 to +14. Also, consider 60-inch image data at a resolution of 1,200 dpi (dot per inch).

Assume that a correction amount is set every 1 dot in the main scanning direction, as in the example shown in FIG. 5A. In this case, if a correction amount for the first dot is a reference point (a correction amount of 0), the number of bits necessary for representing a correction amount for 1 dot is 5 bits (1 bit for a sign+4 bits for an absolute value). Consequently, the correction amount holding circuit 110 stores 72,000 correction amounts, thereby increasing the size of the circuit.

On the other hand, in the example shown in FIG. 5B, a correction amount is set for each block having 256 dots in the main scanning direction. That is, a correction amount is set for each of the plurality of blocks. The correction amount is represented by 2 bits (1 bit for a sign+1 bit for an absolute value). The correction amount of the first one of the plurality of blocks is a correction amount from the reference point, and the correction amount of each of the other blocks is a change amount from the immediately preceding block in the main scanning direction. This can decrease the size of the correction amount holding circuit 110.

In the example shown in FIG. 5B, the correction amount of each of blocks adjacent to each other in the main scanning direction is one of +1, 0, and −1. This can further decrease the size of the correction amount holding circuit 110.

A correction amount set as shown in FIG. 5B is sufficient to correct a shift of the print image in the direction parallel to the sub-scanning direction with respect to the image based on the image data. Assume, therefore, that the correction amount holding circuit 110 stores the correction amounts shown in FIG. 5B in the correction amount table.

Referring back to FIG. 2, the image correction processing circuit 109 generates a plurality of correction data based on the plurality of extended output data stored in the SRAM 106, respectively.

FIG. 6A is a block diagram showing an arrangement example of the image correction processing circuit 109 shown in FIG. 2. FIG. 6B is a block diagram showing another arrangement example of the image correction processing circuit 109.

As shown in FIG. 6A, the image correction processing circuit 109 has a correction value generation circuit (total correction amount calculation circuit) 109a, a data buffer 109b, and an image data generation circuit 109c.

The correction value generation circuit 109a receives correction amount information output from the correction amount holding circuit 110, and generates a correction amount based on the received correction amount information.

FIG. 7 is a table showing examples of the correction amount (total correction amount) calculated by the correction value generation circuit (total correction amount calculation circuit) 109c shown in FIG. 6A. The correction value of the block 1-1 is zero which has been set with respect to the block 1-1. Here, the block 1-1 is determined as a reference block.

The total correction amounts shown in FIG. 7 are obtained when the correction amount holding circuit 110 stores the correction amount table shown in FIG. 5B. In this case, for example, the total correction amount of the block 1-2 is +1 obtained by adding the correction amount (+1) of the block 1-2 to the correction amount (0) of the block 1-1. The total correction amount of the block 1-3 is +2 obtained by adding the correction amount (+1) of the block 1-3 to the total collection amount (+1) of the block 1-2. That is, the total correction amount of each block is a value obtained by accumulating the correction amounts from the reference block to the calculation target block.

Referring back to FIG. 6A, the data buffer 109b receives, via the memory control circuit 105, the extended divided image data stored in the SRAM 106, and stores it.

Based on the extended divided image data stored in the data buffer 109b, the image data generation circuit 109c generates image data according to the correction amount generated by the correction value generation circuit 109a. The image data generation circuit 109c outputs the generated image data to the memory control circuit 105. The memory control circuit 105 stores the image data in the DDR-DRAM 115.

Figure 8:
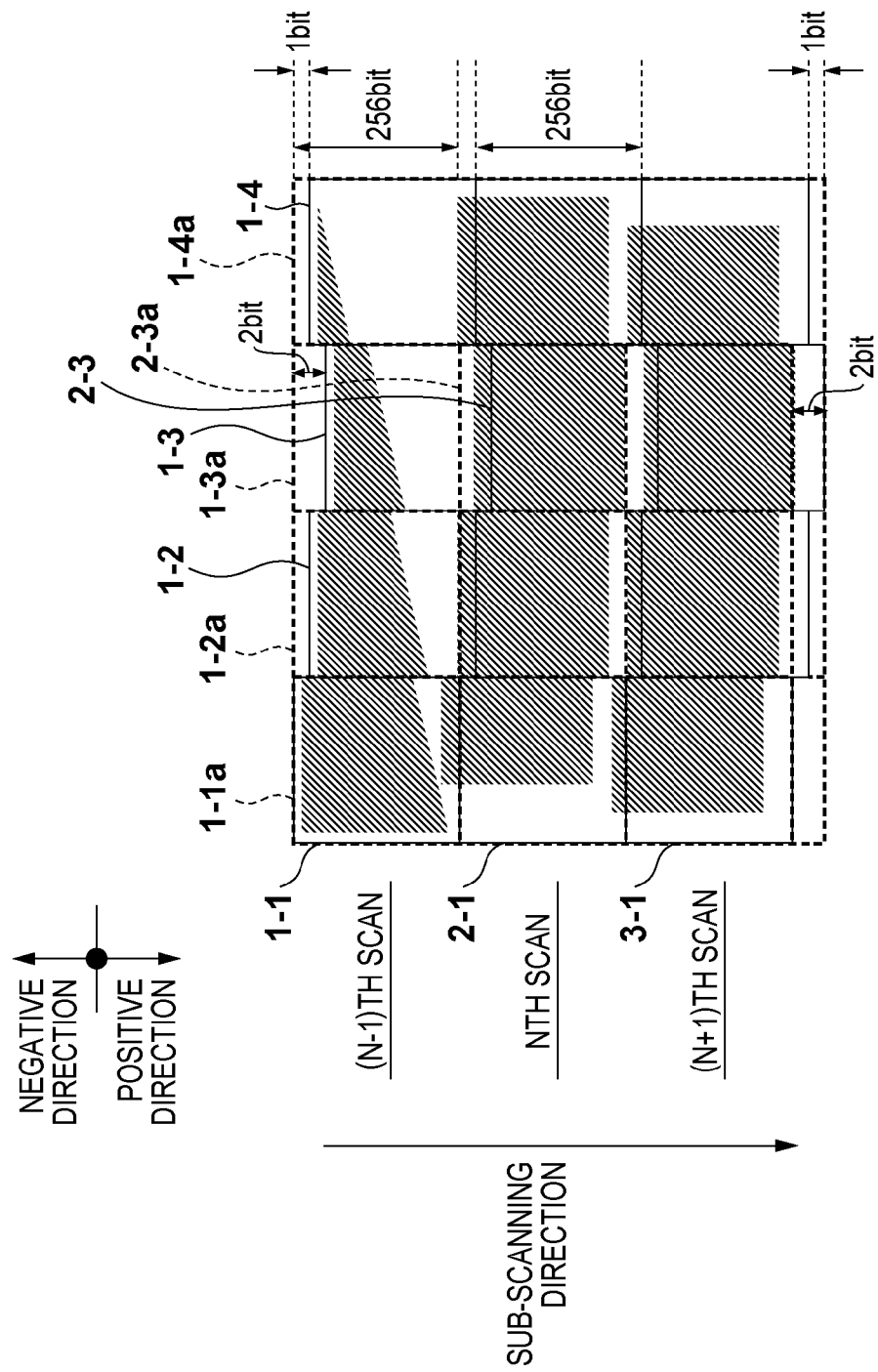
FIG. 8 is a view showing an image of image data which has been corrected by an image data generation circuit shown in FIG. 6A.

FIG. 8 is a view virtually showing comparison of an image before processing by the image data generation circuit 109c shown in FIG. 6A with an image after the processing by the image data generation circuit 109c. FIGS. 9A and 9B are views for explaining an operation of generating image data by the image data generation circuit 109c shown in FIG. 6A.

In FIGS. 9A and 9B, if the value of an image correction amount is positive, an image is shifted in the direction of an arrow shown in FIG. 4A, and then stored. If the value of an image correction amount is negative, the image is shifted in the opposite direction of the arrow shown in FIG. 4A, and then stored.

Referring to FIG. 8, the position, in the sub-scanning direction, of an image corresponding to the block 1-1 before processing by the image data generation circuit 109c coincides with that of an image corresponding to a block 1-1a after the processing by the image data generation circuit 109c. This is because the correction amount of the block 1-1 shown in FIG. 7 is 0.

On the other hand, an image corresponding to the block 1-2 shifts by 1 bit in the sub-scanning direction (positive direction) with respect to an image corresponding to a block 1-2a. This is because the correction amount of the block 1-2 shown in FIG. 7 is +1.

An image corresponding to the block 1-3 shifts by 2 bits in the sub-scanning direction (positive direction) with respect to an image corresponding to a block 1-3a. This is because the correction amount of the block 1-3 shown in FIG. 7 is +2. An image corresponding to the block 1-4 shifts by 1 bit in the sub-scanning direction (positive direction) with respect to an image corresponding to a block 1-4a.

FIG. 9A is a view for explaining a case in which work areas W1, W2, and W3 assigned to the SRAM 106 store the divided image data. Work area W1 has 256 bits in the main scanning direction and 32 bits in the sub-scanning direction. Work area W2 has 256 bits in the main scanning direction and 256 bits in the sub-scanning direction. Work area W3 has 256 bits in the main scanning direction and 32 bits in the sub-scanning direction.

FIG. 9A is a view for explaining image data to be used in the first scan. The third block 1-3 in the main scanning direction is exemplified. Work area W1 stores null data (0 data), work area W2 stores the block 1-3, and work area W3 stores the upper 32 bits, in the sub-scanning direction, of the block 2-3. Note that since there is no divided image data above the block 1-3 in the sub-scanning direction, the work area W1 stores null data. In other words, since the block 1-3 is divided image data printed in the first scan, the work area W1 stores null data.

Based on the correction amounts shown in FIG. 7, data for 256 bits designated by an extraction range is read out from the work areas W1, W2, and W3 assigned to the SRAM 106. The extraction range includes 2 bits of the work area W1 and 254 bits of the work area W2, as shown in FIG. 9A. Consequently, the image data is corrected by 2 bits in the positive direction. Note that the same processing as that for the block 1-3 is sequentially executed for the blocks 1-1 and 1-2 before the block 1-3, and is executed for the block 1-4 after the block 1-3.

Data of a hatched region 31 in the work area W2 is used to process the block 2-3.

FIG. 9B is a view for explaining a case in which the work areas W1, W2, and W3 assigned to the SRAM 106 store divided image data to be used in the second scan.

In FIG. 9B, the same processing as that in FIG. 9A is executed. Based on the correction amounts shown in FIG. 7, data for 256 bits designated by an extraction range is read out from the work areas W1, W2, and W3 assigned to the SRAM 106. The extraction range includes 2 bits of the work area W1 and 254 bits of the work area W2, as shown in FIG. 9B. Note that 2 bits of the work area W1 shown in FIG. 9B correspond to the data of the region 31 shown in FIG. 9A. Even if these data are processed in different scans according to the correction amounts, the continuity (consistency) of the image is never lost.

Figure 10:
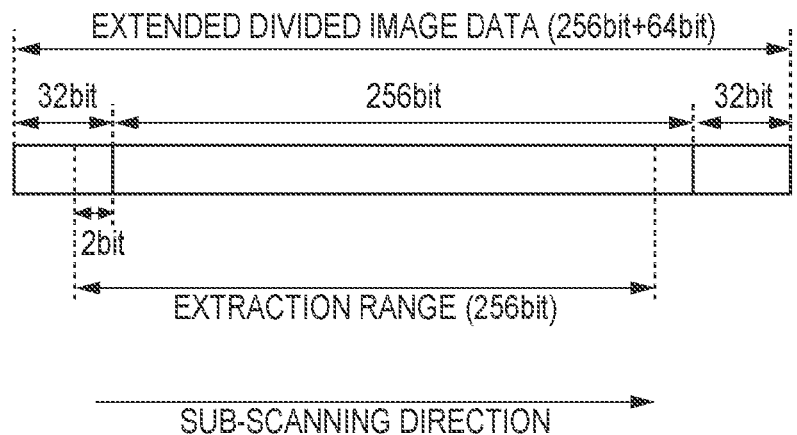
FIG. 10 is a view for explaining correction data generated by the image data generating circuit shown in FIG. 6A.

FIG. 10 is a view for explaining the extended divided image data stored in the data buffer 109b shown in FIG. 6A, and explaining a range within which the image data generation circuit 109c extracts an area of the data buffer 109b. Note that the size of the extended divided image data is 320 bits.

As shown in FIG. 10, the image data generation circuit 109c selects and extracts image data having continuous 256 bits of (256+64 bits) which constitute the extended divided image data.

Referring back to FIG. 2, the DDR-DRAM 115 stores the image data extracted by the image data generation circuit 109c.

The discharge image generation circuit 111 converts the image data stored in the DDR-DRAM 115 into data (to be referred to as discharge image data hereinafter) in a format according to the shape of the nozzles of the print head 301.

The transfer timing control circuit 113 generates a transfer timing signal of a signal input from the encoder sensor 306 by multiplying the signal.

The head interface circuit 112 outputs the discharge image data to the print head 301 at a timing indicated by the transfer timing signal generated by the transfer timing control circuit 113.

The drive circuit 114 drives the motor 116, and controls a sensor (not shown).

The operation of the printing apparatus 300 having the above-described arrangement will be described below.

Figure 11:
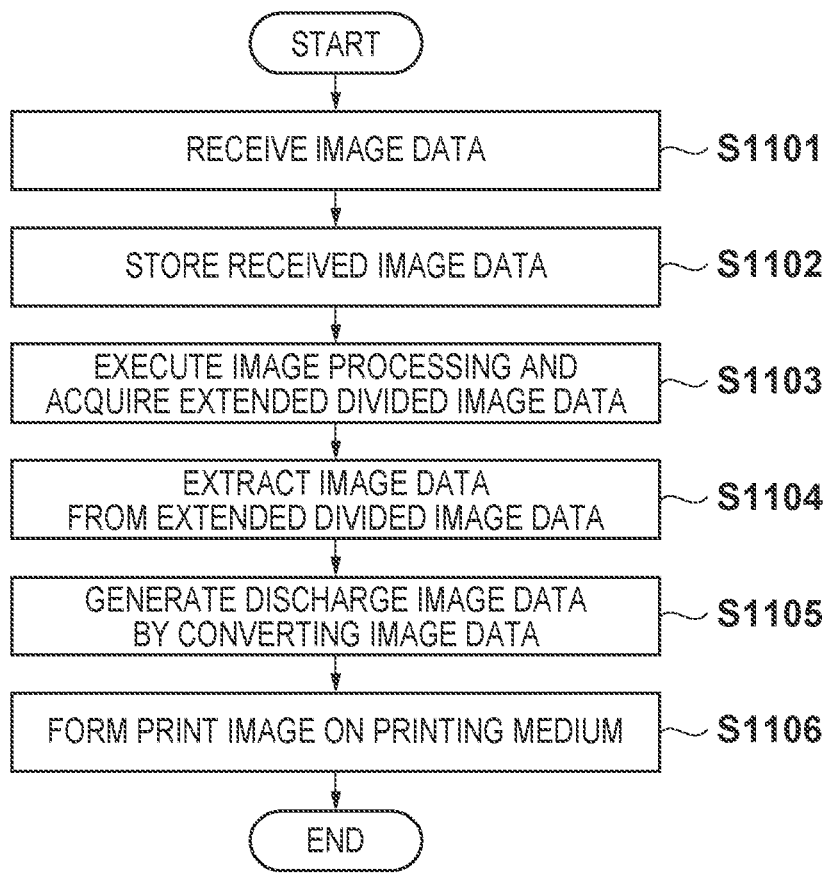
FIG. 11 is a flowchart for explaining the operation of a printing apparatus according to the first embodiment.

FIG. 11 is a flowchart for explaining the operation of the printing apparatus 300 shown in FIG. 1. Note that the size of the divided image data is (256 bits×256 bits) and the size of the extended divided image data is ((256+64) bits×256 bits).

The external input device 100 transmits image data to the printing apparatus 300.

The external interface circuit 103 of the printing apparatus 300 receives the image data transmitted from the external input device 100 (step S1101).

The memory control circuit 105 stores the image data received by the external interface circuit 103 in the SRAM 106 by a size of (256 bits×256 bits) (step S1102).

The image data processing circuit 107 reads out data with ((256+64) bits×256 bits) of the image data stored in the SRAM 106, and executes image processing for the readout image data (extended divided image data) (step S1103).

The image correction processing circuit 109 extracts image data from the extended divided image data based on a total correction amount calculated from correction amounts stored in the correction amount holding circuit 110 (step S1104). Note that the extracted image data is output to the memory control circuit 105 and stored in the DDR-DRAM 115 by 256 bits.

The discharge image generation circuit 111 generates discharge image data by converting the image data stored in the DDR-DRAM 115 into data in a format according to the shape of the nozzles of the print head 301 (step S1105).

The head interface circuit 112 outputs the discharge image data to the print head 301 at a transfer timing which has been generated by the transfer timing control circuit 113 based on the encoder sensor 306.

Upon receiving the discharge image data output from the head interface circuit 112, the print head 301 forms an image based on the received discharge image data on the printing medium P by discharging ink from the nozzles (S1106).

The operation of generating correction data in step S1104 described above will be explained in detail next.

FIG. 12 is a flowchart for explaining details of the operation of generating correction data in the operation sequence shown in FIG. 11.

The correction amount holding circuit 110 outputs, to the total correction amount calculation circuit 109a, correction amount information indicating correction amounts corresponding to the extended output data generated by the image data processing circuit 107.

Upon receiving the correction amount information output from the correction amount holding circuit 110, the total correction amount calculation circuit 109a calculates a total correction amount from the correction amounts indicated by the received correction amount information (step S1201).

The memory control circuit 105 reads out data having a size of (256 bits×28 bits) from the extended output data stored in the SRAM 106, and stores it in the data buffer 109b (step S1202).

The image data generation circuit 109c generates, from the data stored in the data buffer 109b, 256-bit data in which a printing position has been corrected in a direction parallel to the sub-scanning direction in accordance with the total correction amount calculated by the total correction amount calculation circuit 109a (S1203).

The image data generation circuit 109c outputs the generated data to the memory control circuit 105 (step S1204).

The image data generation circuit 109c counts up the number of data output operations (step S1205). Then, the image data generation circuit 109c determines, as a result of counting up the number of data output operations, whether the number of data output operations has reached 256 (step S1206).

If, as a result of the determination in step S1206, the number of data output operations has not reached 256, the process returns to step S1202. More specifically, the memory control circuit 105 reads out data having a size of (256 bits×28 bits), which has not been read out, of the extended output data stored in the SRAM 106, and stores it in the data buffer 109b.

Alternatively, if, as a result of the determination in step S1206, the number of data output operations has reached 256, the process ends.

By repeating generation of 256-bit data 256 times, correction data is generated. Note that if the data buffer 109b has enough capacity, it may store the entire extended output data with ((256+28) bits×256 bits). In this case, it is possible to generate correction data without repeating generation of 256-bit data.

In this example, the total correction amount calculation circuit 109a calculates the total correction amount after the image data processing circuit 107 executes image processing. Since buses to be used for the image processing and the total correction amount calculation are different from each other, these processes may be executed in parallel.

As described above, in this embodiment, to correct a shift of a print image with respect to an image based on image data, it is not necessary to limit the nozzles to be used. Furthermore, since a shift of a print image is corrected with a correction amount according to the deflection amount of a carriage shaft, it is possible to perform high accuracy correction.

It is, therefore, possible to obtain a high quality print image without prolonging the time taken to form the print image.

Second Embodiment

In the method described in the first embodiment, if a correction amount is in the negative direction, an image to be printed in the first scan may not be printed.

In this embodiment, to avoid this problem, a correction amount having, as a reference point, a block in which a correction amount in the negative direction is maximum is calculated. This correction amount is set by setting, as a reference point, a position where a shift of the printing position of a print image in the sub-scanning direction with respect to an image based on image data is maximum.

In this embodiment, as shown in FIG. 6B, a correction value adjustment circuit 109d is added to an image correction processing circuit 109. Other components in this embodiment are the same as those in the first embodiment, and a description thereof will be omitted.

Figure 13:
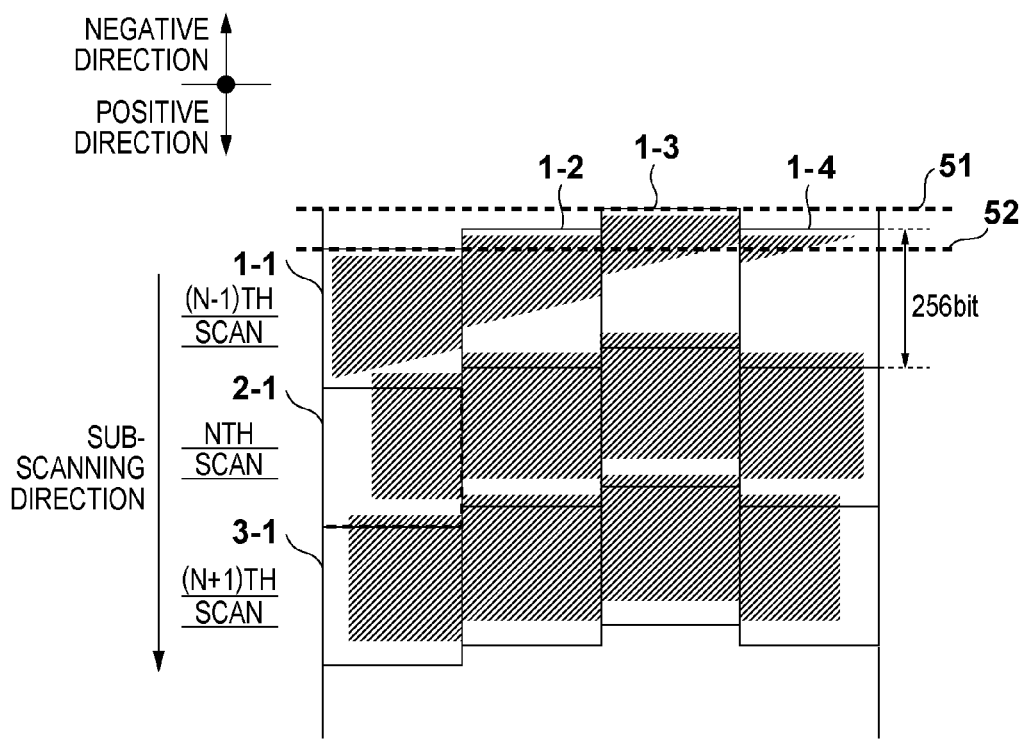
FIG. 13A is a view showing an image of image data which has been corrected according to a correction amount obtained in the arrangement of FIG. 6B.
FIG. 13B is a table showing another example of a correction amount table structure obtained in the arrangement of FIG. 6B.

As shown in FIG. 13B, the correction value adjustment circuit 109d calculates a new correction amount based on a correction amount generated by a correction value generation circuit 109a. The calculated new correction amount is stored in a correction amount table held in the image correction processing circuit 109.

FIG. 13A is a schematic view for explaining image data which has been generated according to the new correction amount generated by the correction value adjustment circuit 109d shown in FIG. 6B.

As shown in FIG. 13B, a maximum correction amount in the negative direction is the correction amount "−2" of a block 1-3.

In FIG. 13A, assume that a position indicated by a broken line 51 represents a position of the correction amount of −2 bits. In this case, all of a plurality of blocks need only be stored downstream of the broken line 51 in the sub-scanning direction. A new correction amount of each of the plurality of blocks is, therefore, obtained by subtracting the maximum correction amount in the negative direction from the correction amount of the block.

As shown in FIG. 13B, for example, a new correction amount of a block 1-2 is "+1" obtained by subtracting, from the correction amount (−1) of the block 1-2, the correction amount (−2) of the block 1-3 which is the maximum correction amount in the negative direction.

In the first embodiment, correction is performed so that a position (indicated by a broken line 52) where a correction amount is 0 coincides with the leading end in a direction parallel to the sub-scanning direction. If there is a correction amount in the negative direction, therefore, an image to be printed in the first scan is not printed.

The operation of a printing apparatus 300 having the above-described arrangement will be described below.

Figure 14:
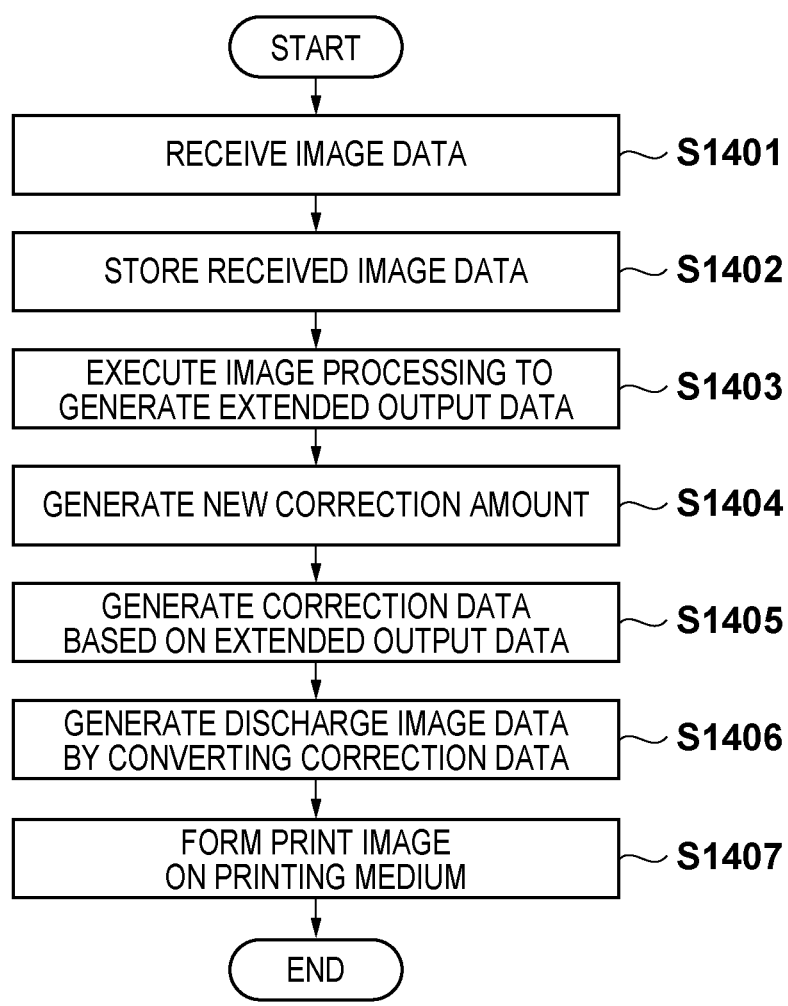
FIG. 14 is a flowchart for explaining the operation of a printing apparatus according to the second embodiment.

FIG. 14 is a flowchart for explaining the operation of the printing apparatus 300 according to this embodiment.

Operations in steps S1401 to S1403 in the flowchart shown in FIG. 14 are the same as those in steps S1101 to S1103 in the flowchart shown in FIG. 11, and a description thereof will be omitted.

The correction value adjustment circuit 109d calculates a new correction amount using a maximum correction amount in the negative direction of the correction amounts of a plurality of blocks stored in a correction amount holding circuit 110, and each of the other correction amounts (S1404).

Operations in steps S1405 to S1407 in the flowchart shown in FIG. 14 are the same as those in steps S1104 to S1106 in the flowchart shown in FIG. 11, and a description thereof will be omitted.

As described above, in this embodiment, it is possible to avoid a problem that an image to be printed in the first scan is not printed, in addition to the effects obtained in the first embodiment.

Note that the above first and second embodiments have been described on the assumption that correction amounts for all of a plurality of colors are equal to each other. It is, however, possible to set a correction amount not only every predetermined unit in the main scanning direction but also for each of the plurality of colors, and to store it in the correction amount holding circuit 110. With this processing, even if a print head in which the placement of a nozzle is different for each of the plurality of colors is used, it is possible to correct a shift of a print image in a direction parallel to the sub-scanning direction.

In the present invention, processing of the printing apparatus need not be implemented by the above-described dedicated hardware. More specifically, a program for implementing the function may be recorded on a printing apparatus-readable recording medium, and then the printing apparatus may load and execute the program recorded on the recording medium. The printing apparatus-readable recording medium includes a removable recording medium such as a flexible disk, magnetooptical disk, DVD, and CD, and an HDD incorporated in the printing apparatus.

Third Embodiment

Figure 15:
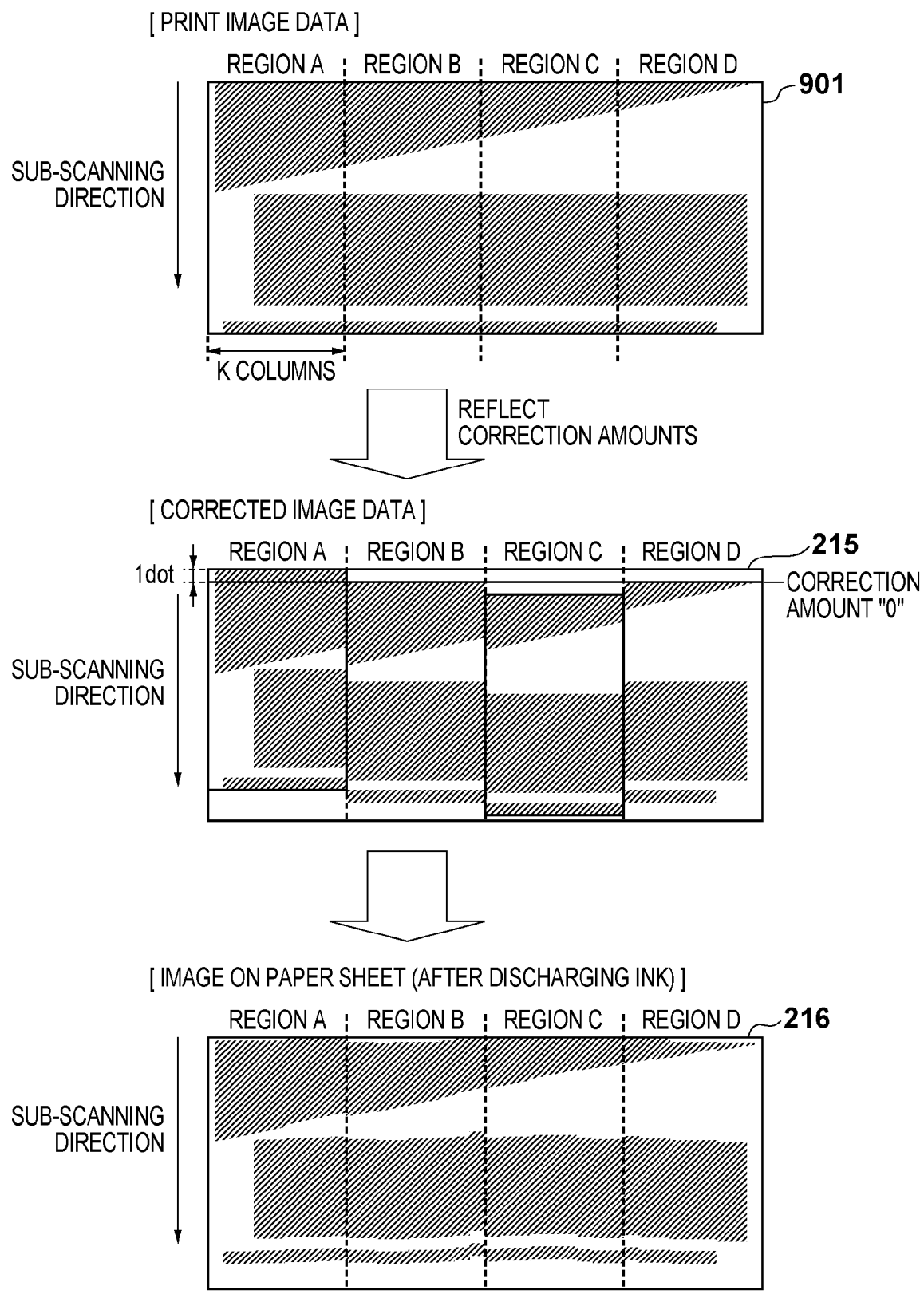
FIG. 15 is a view for explaining an overview of an image data processing method according to the third embodiment.

FIG. 15 is a view for explaining an overview of an image data processing method according to this embodiment.

Figure 16A:
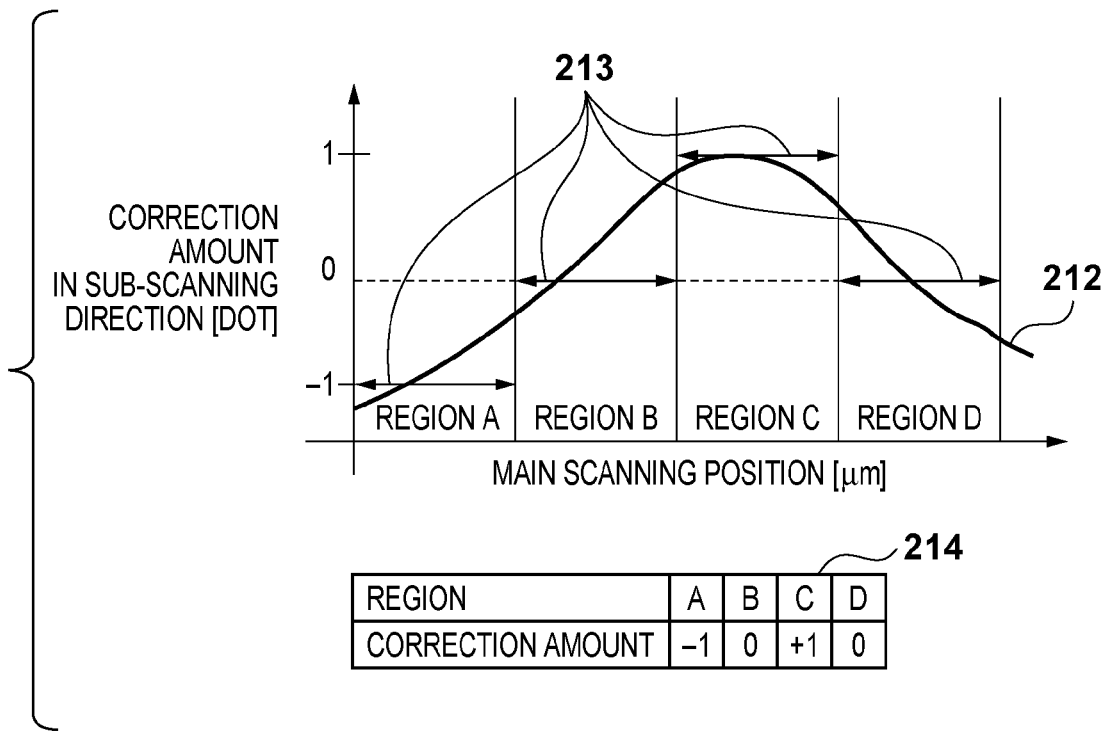
FIG. 16A is a view showing a correction curve in the sub-scanning direction with respect to positions in the main scanning direction.

FIG. 15 is a view showing a procedure of printing an image on a printing paper sheet using image data 901. FIG. 16A is a view showing a correction curve in the sub-scanning direction with respect to positions in the main scanning direction.

A correction amount calculation method will be described with reference to FIG. 16A. A correction amount is calculated by generating, based on the ink droplet adhering position accuracy in the sub-scanning direction at the main scanning positions, a correction curve 212 which indicates displacement amounts in the sub-scanning direction at the main scanning positions, and obtaining an average per given column unit (to be referred to as a reference column unit, and represented by K hereinafter).

Each of ranges indicated by arrows 213 indicates a reference column unit, which are defined as region A, region B, region C, and region D from the left side. Assume that the correction amount of region A is −1 dot, that of region B is 0 dot, that of region C is +1 dot, and that of region D is 0 dot, as shown in a table 214. If a resolution in the sub-scanning direction is 1,200 dpi, the width of 1 dot is 21.2 μm.

With reference to FIG. 15, transition of image data until the image data 901 is printed on a printing paper sheet will be explained using the image data 901, a corrected image data 215, and an image 216 on the paper sheet. Regions A to D in each image data are identical to those indicated by the arrows 213 of the correction curve 212 in FIG. 16A. If the sub-scanning direction is a downward direction as shown in FIG. 15, a region above the line of the correction amount "0" indicates negative correction, and a region below the line indicates positive correction.

The image data 901 input to the printing apparatus is stored in a memory as the corrected image data 215 to which the correction amounts in the table 214 have been reflected (the correction processing method will be described in detail later with reference to FIG. 19). When a print head discharges ink using the corrected image data, the image 216 is printed on the printing paper sheet. As described above, by performing correction, it becomes possible to print a higher quality image on the printing paper sheet as compared with, for example, an image 902 shown in FIG. 25.

Figure 16B:
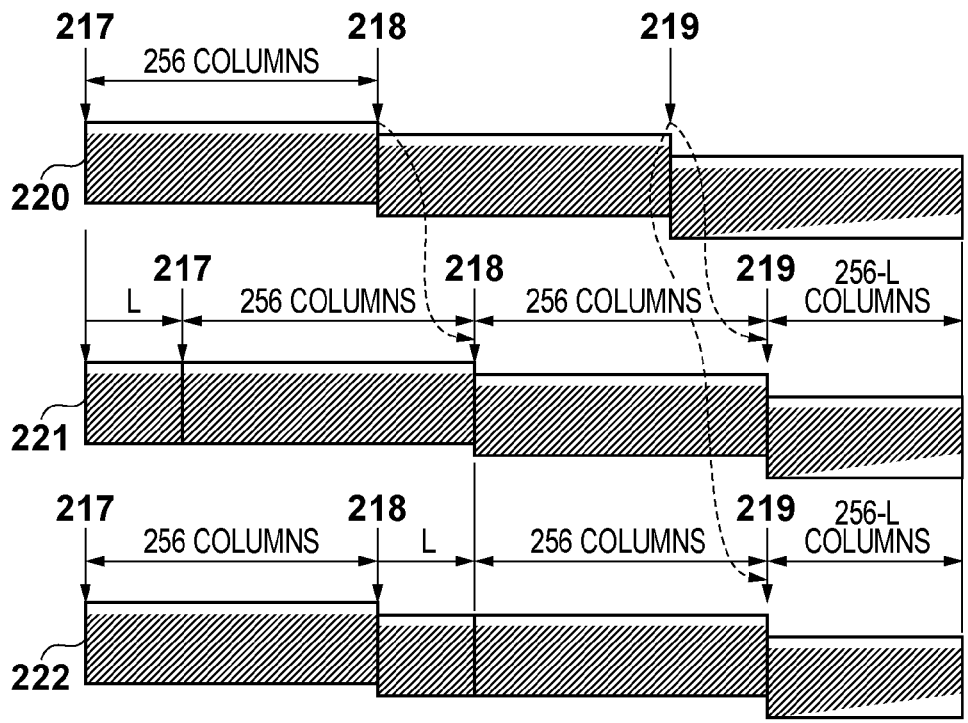
FIG. 16B is a view showing a method of changing a correction position in the column direction for each ink color.

FIG. 16B is a view showing a method of changing a correction position in the column direction for each color. Note that a reference column unit is temporarily set to 256 columns. Referring to FIG. 16B, reference numeral 220 denotes image data which changes per reference column unit of 256 columns; and 221 or 222, data showing printing of an image based on the image data in which a correction amount changes at a position without conforming to the reference column unit. Referring to FIG. 16B, correction value changing points (indicated by arrows 217, 218, and 219 in FIG. 16B) are shifted by adding a value of an offset L (for example, 64 columns) different for each color. This enables to change a correction position in the column direction for each color like the color data 221 while the reference column unit is constant for all the colors.

The number of last image correction columns decreases by the added offset L. In the data 221, a method of inserting the offset L in the beginning of the image data is shown. The offset L, however, may be added in the middle of the image data like the data 222.

A method of detecting the deflection amount of a shaft includes a method of obtaining the deflection amount by discharging ink upon shipping from a factory, or a method of detecting the deflection amount using an optical sensor. Since it can be expected that the deflection amount of the shaft does not change at a given point in the main scanning direction, it is basically possible to use the same value as a correction amount in printing in the first scan and the second scan.

Figure 17:
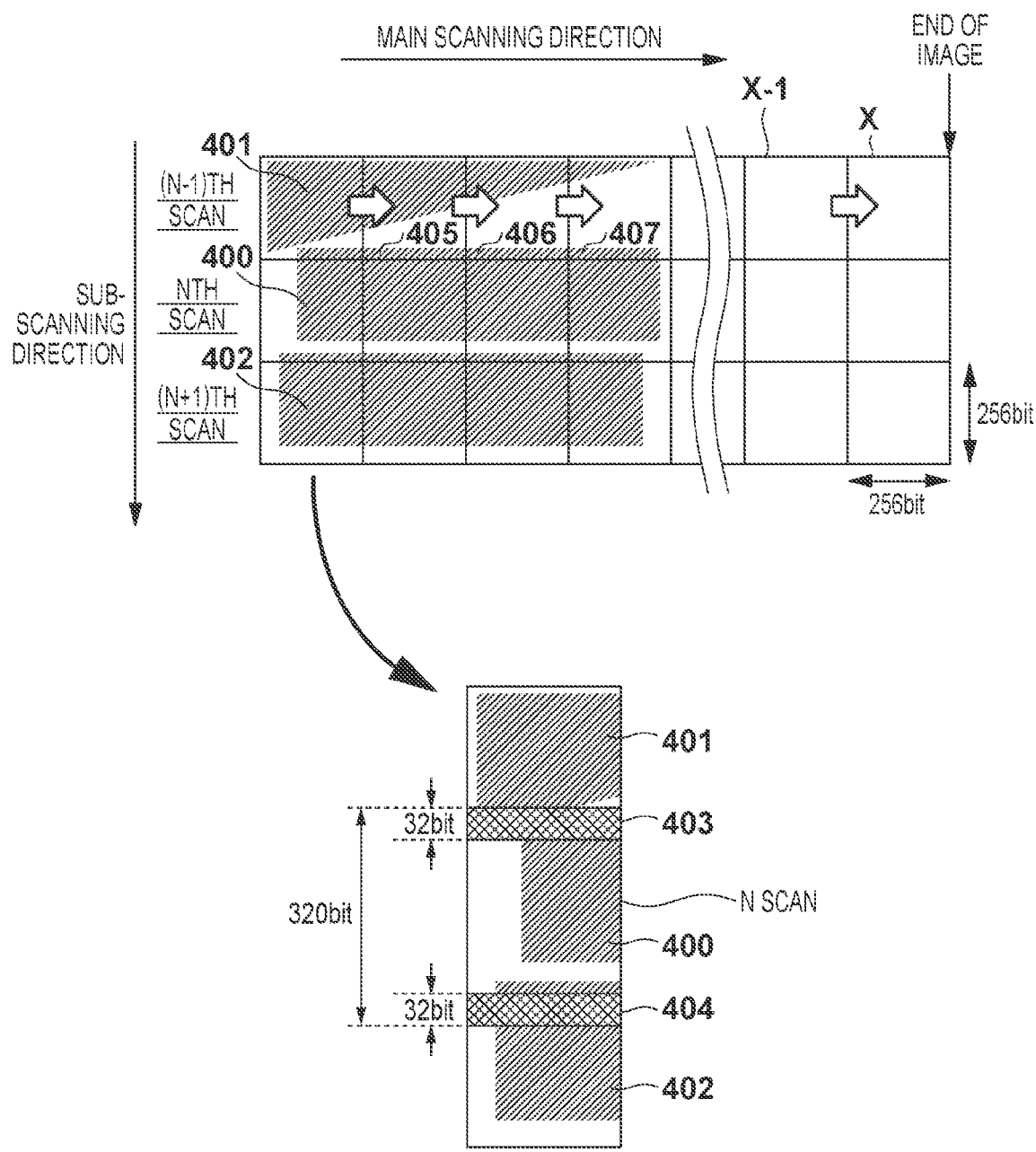
FIG. 17 is a view schematically showing image data processing according to the third embodiment.

FIG. 17 is a view schematically showing image data processing according to this embodiment.

Assume that image data is divided for each color component, and is dealt as an aggregate with 256 bits in the vertical direction and 256 bits in the horizontal direction (a block has a size of 256 bits×256 bits), as shown in FIG. 17. The image data is sequentially processed for each block in the main scanning direction in the order of blocks 401, 405, 406, 407, . . . , and a color to be processed is switched in each block. For example, for three colors, color A in the block 401, color B in the block 401, color C in the block 401, color A in the block 405, . . . are sequentially processed. When processing of image data for the (N−1)th scan ends, data processing for the next Nth scan starts. In this example, assume that processing target color component data is switched in each block. It is also possible to switch color component data in each scan.

To execute image processing, image data adjacent on the upper, lower, right, and left sides of a given block are needed. Assume that 32-bit image data respectively above and below a given block are needed. In this case, to process image data of a block 400, image data with 256 bits in the horizontal direction, 320 bits in the vertical direction, and obtained by combining the lower 32 bits (a region 403) of the block 401 and the upper 32 bits (a region 404) of a block 402, is needed.

According to a conventional technique, if 32-bit image data respectively above and below image data of a given block are used to execute image processing for the image data, the image processing is executed for only the given block. On the other hand, according to the present invention, it is possible to perform correction in the vertical direction (sub-scanning direction) by processing, as a valid image data region (to be referred to as a valid image region hereinafter), a region except for a region unusable in image processing, and then processing it as image data with a size of (256+N) bits×256 bits.

Assume that edge processing is performed. In this case, to process a given bit within the image data, some bits respectively above and below the given bit are necessary. If 12 bits respectively above and below the given bit are needed, the upper 12 bits of 32 bits of the region 403 shown in FIG. 17 cannot undergo edge processing because there are not enough bits above them. The same goes for the lower 12 bits of the region 404 shown in FIG. 17. In this case, it is possible to process, as image data, the upper 20 bits of the region 404 obtained by excluding the lower 12 bits and the lower 20 bits of the region 403 obtained by excluding the upper 12 bits, and it is thus possible to process a region with (256+40) bits×256 bits as a valid image region. Although the edge processing has been exemplified, an applicable image processing is not limited to this. A valid image region changes depending on various image processes, and a possible correction amount correspondingly increases or decreases.

A correction amount holding circuit 110 holds a correction amount corresponding to the deflection amount of a carriage shaft based on position information.

A method of managing correction amounts will be explained using a method of having an absolute correction amount only for the first block, and holding, as a correction amount, a relative amount with respect to a preceding block for each block other than the first block.

Consider, for example, a case in which the correction amount of the first block is +10, the correction amount of the next block (to be referred to as block 1) is +12, and the correction amount of the next block (to be referred to as block 2) after block 1 is +11. In this case, the absolute correction amount "+10" is held for the first block. As the correction amount of block 1, "+2" which is the difference between the correction amount of block 1 and that of the first block is held. As the correction amount of block 2, "−1" which is the difference between the correction amount of block 2 and that of block 1 is held. As another method of managing correction amounts, there is provided a method of holding an absolute correction amount for each block, such as the correction value "10" of block 1 and the correction value "12" of block 2. This increases the data amount to be held. If, however, there is enough memory capacity, the latter method may be used.

Figure 18:
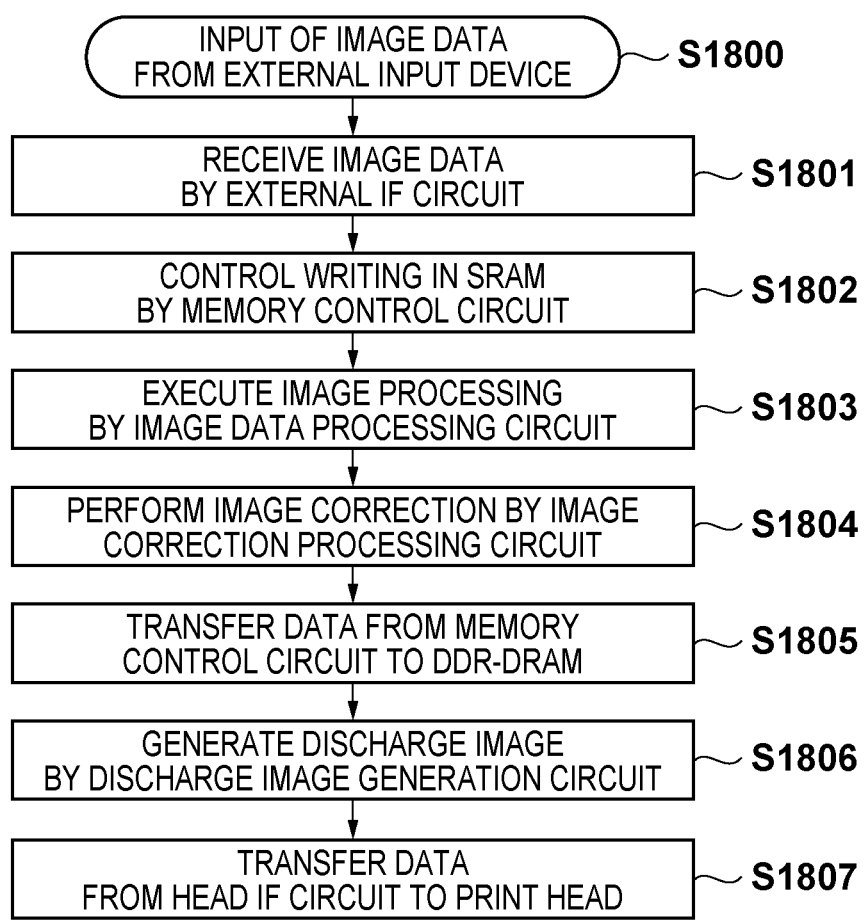
FIG. 18 is a flowchart illustrating image data transfer processing according to the third embodiment.

FIG. 18 is a flowchart illustrating image data transfer processing according to this embodiment. A procedure of transferring image data to the print head will be described with reference to FIG. 18.

In step S1800, an external input device 100 inputs image data. In step S1801, an external interface circuit 103 receives the image data. In step S1802, a memory control circuit 105 writes the image data received by the external interface circuit 103 in an SRAM 106 by one block with 320 bits×256 bits. In step S1803, an image data processing circuit 107 executes image processing for the SRAM 106 storing the image data.

In step S1804, an image correction processing circuit 109 performs, for the SRAM 106 which has undergone the image processing, image correction based on correction amounts held in the correction amount holding circuit 110. A correction amount is changed according to a correction timing change signal output from a correction timing adjustment circuit 108. Note that the image correction processing will be described in detail later with reference to FIG. 20.

In step S1805, the memory control circuit 105 reads out the image data by a given unit, for example, 256 bits, and transfers it to a DDR-DRAM 115. In step S1806, a discharge image generation circuit 111 generates data (discharge image data) in a format according to the nozzle shape of a print head from the DDR-DRAM 115. In step S1807, at a transfer timing generated by a transfer timing control circuit 113 based on a signal from an encoder sensor 306, a head interface circuit 112 transfers the discharge image data to a print head 301.

Figure 19:
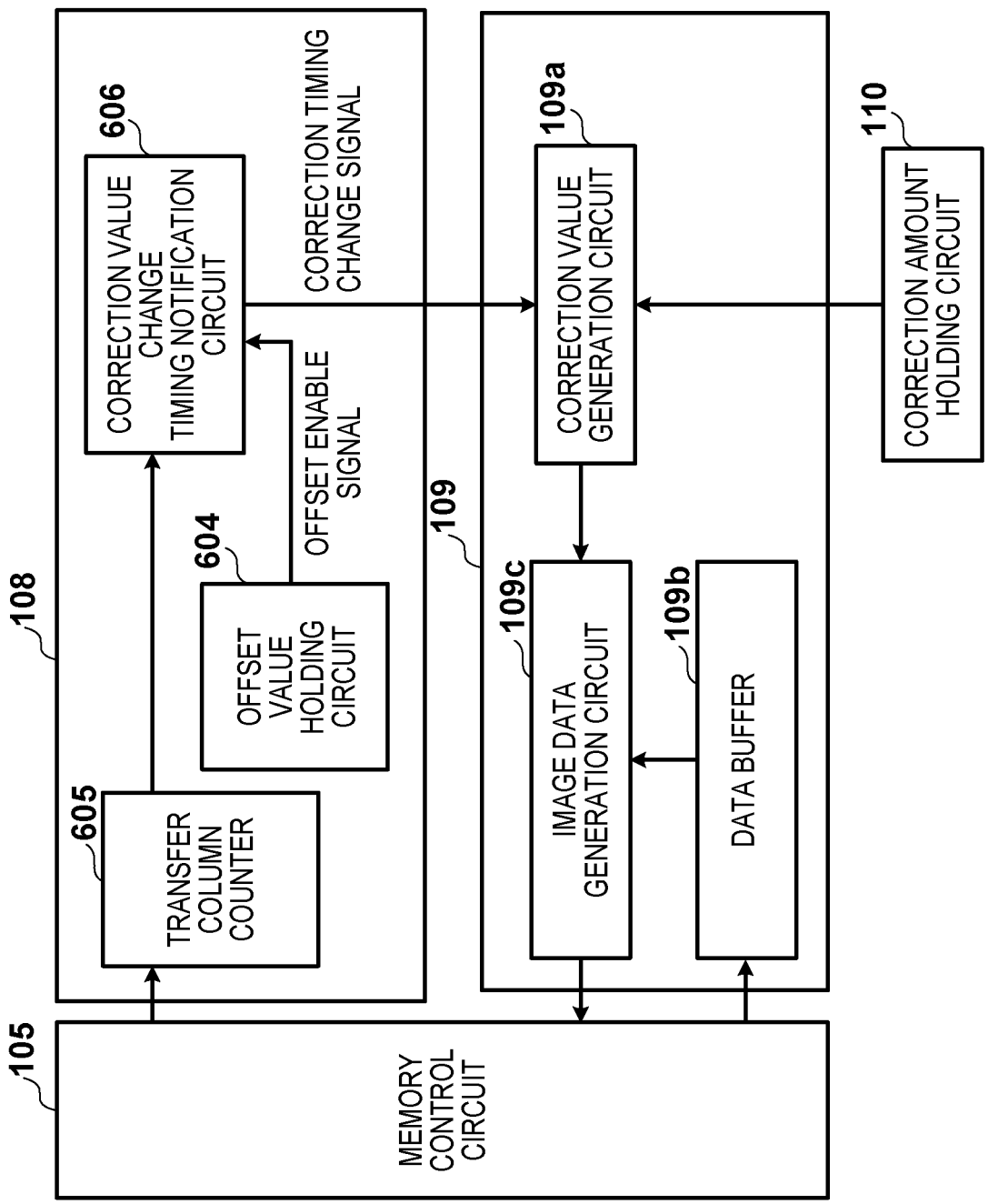
FIG. 19 is a block diagram showing the detailed arrangement of a correction timing adjustment circuit 108 and image correction processing circuit 109 according to the third embodiment.

FIG. 19 is a block diagram showing the internal arrangement of the correction timing adjustment circuit 108 and image correction processing circuit 109. The correction timing adjustment circuit 108 and image correction processing circuit 109 according to this embodiment will be described in detail with reference to FIG. 19. In this embodiment, assume that a reference column unit is 256 columns. Assume also that it is possible to process a region with (256+20) bits×256 bits as a valid image region.

Referring to FIG. 19, the correction timing adjustment circuit 108 includes an offset value holding circuit 604, a transfer column counter 605, and a correction value change timing notification circuit 606. The offset value holding circuit 604 holds, for each color, the number of columns of an offset per reference column unit. Since the reference column unit is 256 columns, necessary offset values are 1 to 255 columns. The circuit only needs to hold an amount of the number of ink colors×8 bits.

The transfer column counter 605 counts the number of columns of image data before correction which has been transferred from the memory control circuit 105 to the data buffer 109b, and the number of columns of image data after correction which has been transferred from the image data generation circuit 109c to the memory control circuit 105. Based on the offset value held in the offset value holding circuit 604 and the counted value of the transfer column counter 605, the correction value change timing notification circuit 606 generates an offset enable signal indicating that an offset is valid. Then, based on the counted value of the transfer column counter 605, the circuit 606 generates a correction timing change signal indicating completion of image data transfer for the reference column unit, and sends it to the correction value generation circuit 109a.

The image correction processing circuit 109 includes the correction value generation circuit 109a, data buffer 109b, and image data generation circuit 109c. Based on the correction amounts held in the correction amount holding circuit 110, the correction value generation circuit 109a calculates the correction amount of a block being currently processed. The circuit 109a changes the correction amount according to the correction timing change signal, and notifies the image data generation circuit 109c of it. The data buffer 109b holds image data transferred from the memory control circuit 105. The image data generation circuit 109c generates, for the image data held in the data buffer 109b, output image data to which the correction amount has been reflected.

Figure 20:
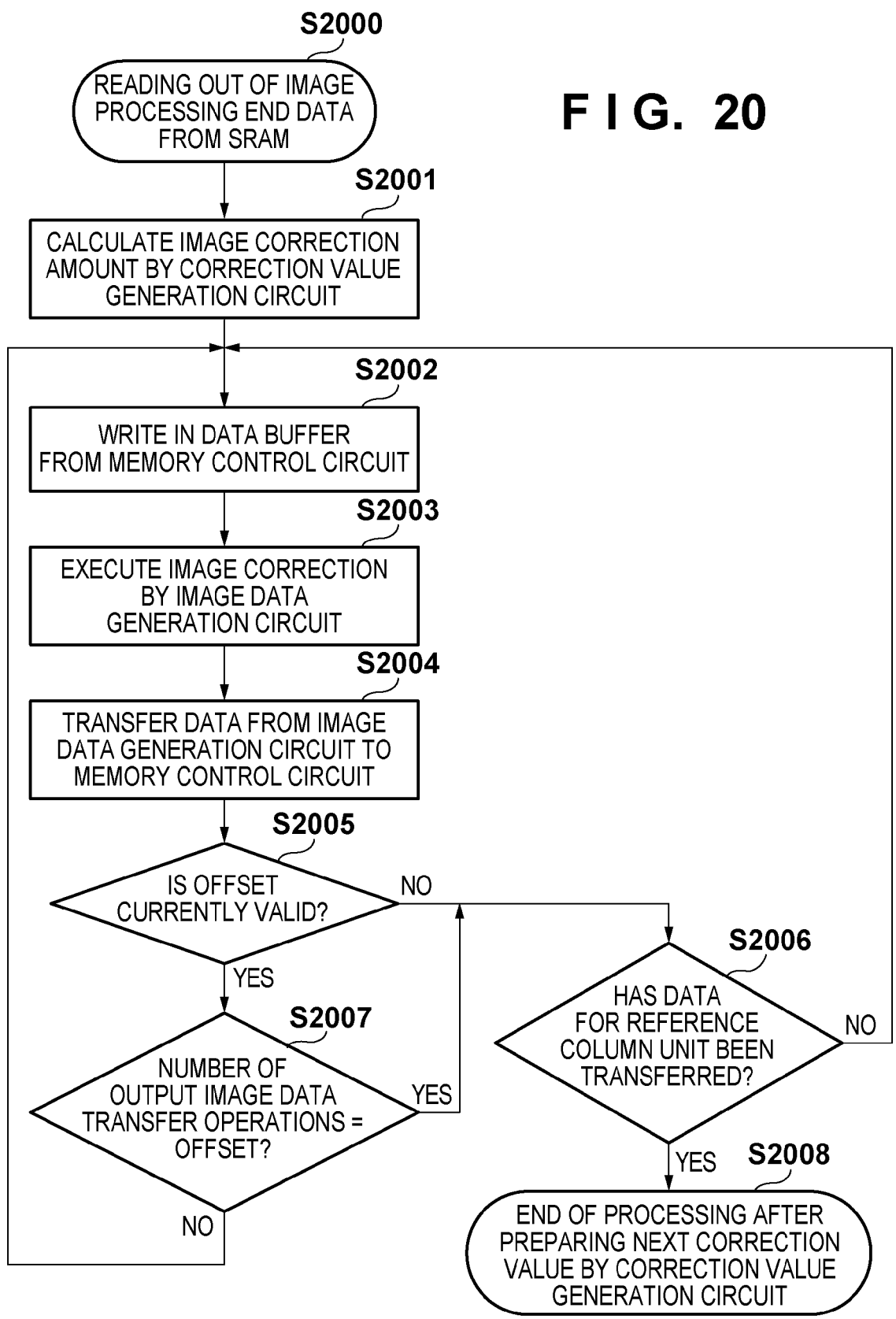
FIG. 20 is a flowchart illustrating processing executed by the correction timing adjustment circuit 108 and image correction processing circuit 109.

FIG. 20 is a flowchart illustrating processing executed by the correction timing adjustment circuit 108 and image correction processing circuit 109 according to this embodiment. Correction processing according to this embodiment will be described with reference to this flowchart. FIG. 20 is a flowchart for explaining details of the processing in step S1804 of FIG. 18.

In step S2000, the memory control circuit 105 reads out, from the SRAM 106, image data of a given block for which the image data processing circuit 107 has executed image processing. In step S2001, the correction amount holding circuit 110 transfers, to the correction value generation circuit 109a, a relative correction amount corresponding to a block to be corrected, and an absolute correction value of the block to be corrected is calculated.

In step S2002, the memory control circuit 105 transfers the image data read out from the SRAM 106, and valid image data with (256+20) bits is stored in the data buffer 109b. In step S2003, the image data generation circuit 109c performs image correction by reflecting, to the valid image data, the correction amount calculated by the correction value generation circuit 109a, and generates 256-bit output image data. In step S2004, the output image data is transferred to the memory control circuit 105.

Subsequent processing changes depending on whether an offset is currently valid, which is indicated by the offset enable signal output from the correction value change timing notification circuit 606.

If it is determined in step S2005 that an offset is currently invalid, that is, the offset enable signal is inactive, the process advances to step S2006. Since columns for the offset are not transferred, it is determined in step S2006 whether the image data generation circuit 109c has transferred the output image data for the reference column unit to the memory control circuit 105. If it is determined that the output image data for the reference column unit has been transferred, the process advances to step S2008. In step S2008, the correction value change timing notification circuit 606 transfers a correction timing change signal to the correction value generation circuit 109a, and preparation for generation of a correction value of the next block starts. Alternatively, if it is determined that the output image data for the reference column unit has not been transferred, the process returns to step S2002 to repeat the processing in steps S2002 to S2006 until the output image data for the reference column unit is transferred.

If it is determined in step S2005 that an offset is currently valid, that is, the offset enable signal is active, the process advances to step S2007. In this case, the correction value change timing notification circuit 606 transfers the offset enable signal to the correction value generation circuit 109a, and the offset enable signal is kept active until output image data for the number of columns of the offset is transferred to the memory control circuit. While the offset enable signal is active, it is determined in step S2007 whether the output image data for the number of columns of the offset has been transferred. Until it is determined that the output image data for the number of columns of the offset has been transferred to the memory control circuit, the process returns to step S2002 to repeat the processing in steps S2002 to S2005 and S2007.

Alternatively, if it is determined that the output image data for the number of columns of the offset has been transferred, the offset enable signal is inactivated, and the process advances from step S2007 to step S2006. Subsequent processing is the same as that when the offset enable signal is inactive.

This processing also considers a case in which the offset enable signal is activated while the output image data for the reference column unit is transferred to the memory control circuit 105 by one column.

For a column immediately after a correction amount changes, the determination in step S2005 may be made, and the processing in steps S2002 to S2004 may be controlled to be repeated until the output image data for the number of columns of the offset is transferred to the memory control circuit.

The correction amount calculation processing in the correction value generation circuit 109a is executed after the image data processing circuit 107 executes the image processing. However, since buses used for the processes are different from each other, the processes may be executed in parallel when the image processing starts. Data transfer from the valid image region is done by (256+20) bits. However, if the data buffer 109b has enough capacity, it is possible to transfer data with (256+20) bits×256 bits at once, and execute correction processing all at once.

An image correction processing method according to this embodiment will be described with reference to FIGS. 21, 22A and 22B.

Figure 21:
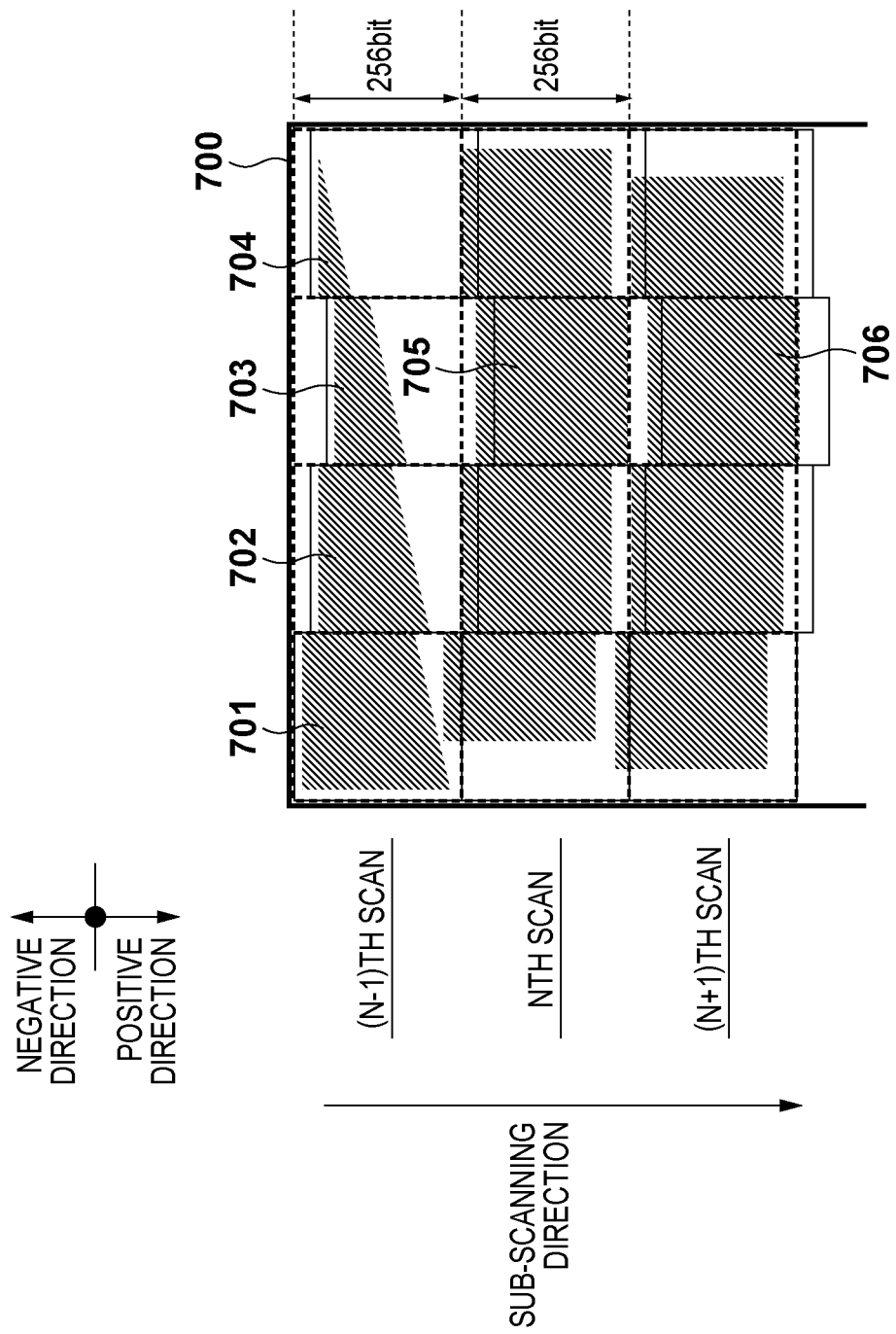
FIG. 21 is a view schematically showing corrected image data according to the third embodiment.

FIG. 21 is a view schematically showing corrected image data.

FIG. 22A is a position information-correction amount table corresponding to blocks shown in FIG. 21. This table is held in the correction amount holding circuit 110. Assume that the sub-scanning direction is a direction indicated by arrows in FIG. 21. When an image is moved upward, an image correction amount is negative. When the image is moved downward, an image correction is positive. Instead of defining a correction amount as a change amount with respect to a reference point, only the first block has a correction amount with respect to the reference point, and each of the other blocks has a change amount with respect to the immediately preceding block as a correction amount. Assume that a change in correction amount between blocks falls within the range of ±1 bit. In this embodiment, the reference column unit is set to 256 columns. If, however, the circuit has enough throughput, the size of the reference column unit may be decreased, the number of correction value changing points may be increased, and a change amount with respect to the reference point may be held as a correction amount.

Referring to FIG. 21, blocks 701 to 704 show the arrangement of image data for each block in consideration of a correction amount. That is, when the image data shown in FIG. 15 undergoes correction, the image data is processed as if it is image data 700 shown in FIG. 21, and stored in the DDR-DRAM 115, thereby enabling printing in consideration of a shaft deflection amount. This is implemented when the image correction processing circuit 109 designates, based on a correction amount, a valid region (a gray region surrounded by broken lines in FIG. 21) (to be referred to as an actual image region hereinafter) with 256 bits in the vertical direction×256 bits in the horizontal direction of the valid image region having undergone image processing, and writes it in the DDR-DRAM 115.

The processing will be explained in more detail with reference to FIGS. 22A and 22B.

FIG. 22B is a view schematically showing a case in which image data obtained by executing image processing for the block 703 and a block 705 is stored in the SRAM 106.

Image data 711 stored in the SRAM 106 includes the lower 32 bits of the block 703+the block 705+the upper 32 bits of a block 706. Since there is no image data above the block 703, image data 710 stored in the SRAM 106 is formed by adding 32-bit "0" data to include 32-bit "0" data+the block 703+the upper 32 bits of the block 705.

Referring to FIG. 22B, a rectangle 709 represents one column, which is a region having a width of 1 bit and a height of 320 bits. Although the image data 710 or 711 is simplified, it has a width of 256 bits, and therefore image data for each block with 256 columns is held.

It is apparent from FIG. 22A that each of the blocks 703 and 705 undergoes correction with a correction amount of +2 in the vertical direction with respect to the reference point. The image data 710 stored in the SRAM 106 will be exemplified. Correction with a correction amount of +2 in the vertical direction means that data for 256 bits from an address 2 bits above the block 703 is transferred to the DDR-DRAM 115 by one column. That is, 2-bit "0" data+a region (a gray region 708 surrounded by broken lines) of 254-bit image data of the block 703 is transferred to the DDR-DRAM 115 by one column. The lower 2 bits (a hatched region 707) of the block which have not been transferred in this scan will be transferred in a next scan.

Similarly, since the image data 711 stored in the SRAM 106 is corrected with a correction amount of +2 in the vertical direction, 256 continuous bits from a position 2 bits above the block 705 are obtained as an actual image region. Since a 2-bit image data region above the block 705 is the region (hatched region 707) of the block 703 which would be transferred in the next scan, the continuity is never lost. Since the image data processing circuit 107 processes the data of the valid image region in the SRAM 106 as continuous data, it is possible to perform correction in the sub-scanning direction without losing the consistency of the image data even if several bits are transferred for processing in the next scan.

This processing will be described using a rectangle 712. That is, one column is 320-bit data, from which image region data processed by the image data processing circuit 107 will be processed. The same processing as that described with reference to FIG. 10 will be executed. In consideration of a correction amount for the image data, 256-bit continuous image data is extracted from the image data. The processing is executed in step S2003 of FIG. 20.

Assume that a correction amount is positive. In this case, image data in which there are not null data for a given scan in the lower portion of a print image is shifted by performing correction, thereby missing a part of an image for the last scan. If there are not enough null data, the external input device 100 inputs, as image data, data obtained by adding null data for one scan below the print image, thereby enabling to perform correction without missing any part of the image.

According to this embodiment described above, by changing the number of columns of the offset for each color, it is possible to change a correction position in the column direction, thereby allowing to print a high quality image with no shift in the sub-scanning direction. Since it is possible to change a correction position for each ink color, it is also possible to intentionally shift a changing point between colors.

Note that in the embodiment described above, an offset for each ink color may be set every 1 column or every N columns where N is a positive integer of 2 or larger.

Fourth Embodiment

A case in which an amount of a table for storing offset amounts set for respective ink colors decreases will be described.

In this embodiment, only the internal arrangement of a correction timing adjustment circuit 108 is different. Other apparatus arrangements, circuit arrangements, and data processing are the same as those in the third embodiment, and a description thereof will be omitted. Only the different parts will be explained. A circuit arrangement specific to this embodiment will be described below.

Figures 23A, 23B, 24:
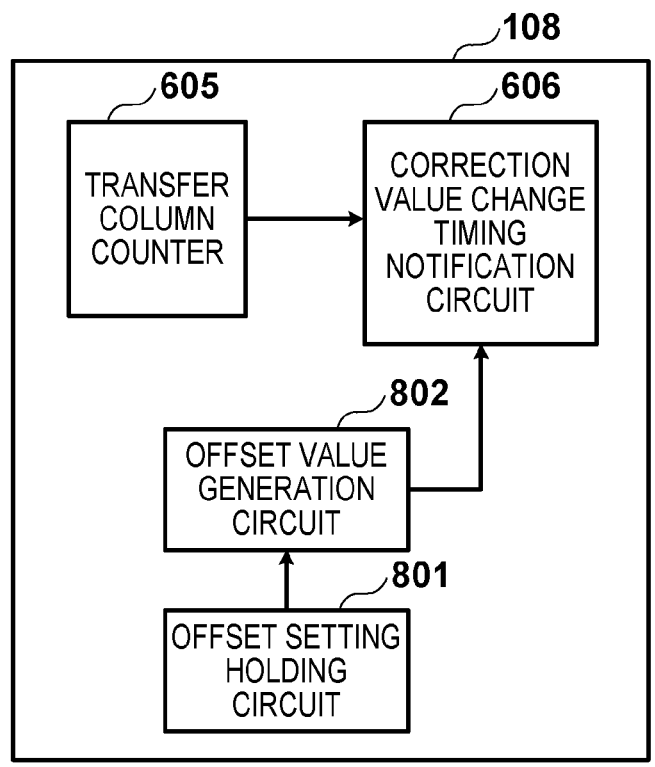
FIG. 23A is a block diagram showing the internal arrangement of a correction timing adjustment circuit 108 according to the fourth embodiment.
FIG. 23B is a table showing contents of a table indicating offset settings.
FIG. 24 is a table according to the fifth embodiment.

FIG. 23A is a block diagram showing the internal arrangement of the correction timing adjustment circuit 108. FIG. 23B is a table showing offset settings. Assume that there are four colors A, B, C, and D. Note that some internal components of the correction timing adjustment circuit 108 are the same as those in the third embodiment, and a description thereof will be omitted. Only an offset setting holding circuit 801 and offset value generation circuit 802 specific to this embodiment will be described.

The offset setting holding circuit 801 holds the table shown in FIG. 23B. In this table, a shift 803 indicates the number of columns for which an offset amount is set, and a color name 804 indicates the number of times of occurrence of the offset amount for each color. In this example, for color A, 8 columns×3 times=24 columns. For color B, 8 columns×5 times=40 columns. For color C, 8 columns×10 times=80 columns. For color D, 8 columns×31 times=248 columns. This calculation is executed by the offset value generation circuit 802 to determine an offset value. The number of columns settable in the field of the shift 803 is restricted to the designated number, and the offset amount is also restricted, thereby decreasing the amount of the table.

According to the embodiment described above, while decreasing the amount of the table, it is possible to change a correction position in the column direction for each ink color, and intentionally shift a changing point between colors, thereby imparting gradation to the colors.

Fifth Embodiment

In the third and fourth embodiments, there is no correlation between the numbers of offset columns for respective ink colors. In this embodiment, a case in which there is a correlation between the numbers of offset columns for respective ink colors will be described.

In this embodiment, the internal arrangement of a correction timing adjustment circuit 108 is the same as that in the fourth embodiment, and other apparatus arrangements, circuit arrangements, and data processing are the same as those in the third embodiment. A description thereof will be omitted, and only an arrangement specific to this embodiment will be explained. Only a table held in an offset setting holding circuit 801 will be described here. Assume that there are four colors A, B, C, and D.

The offset setting holding circuit 801 holds a table shown in FIG. 24. In this table, a reference color 805 indicates a reference color, a reference column 806 indicates the number of offset columns for the reference color, and a color name 807 indicates the difference between the value of the reference column 806 and a corresponding correction amount. In this example, 10 columns for color A, 10+10 columns=20 columns for color B, 10−3 columns=7 columns for color C, and 10+5 columns=15 columns for color D are obtained.

According to this embodiment described above, while there is a correlation between the numbers of offset columns for respective ink colors, it is possible to change a correction position in the column direction for each ink color, and intentionally shift a changing point between colors, thereby imparting gradation to the colors.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-276832 filed Dec. 13, 2010, and 2011-086752 filed Apr. 8, 2011, which are hereby incorporated by reference herein in their entirety.

What is claimed is:

1. A printing apparatus comprising:
    a movement unit configured to move a carriage incorporating a print head along a carriage shaft arranged in a main scanning direction;
    a conveyance unit configured to convey a printing medium in a sub-scanning direction perpendicular to the main scanning direction;
    a storage unit configured to store image data;
    a reading unit configured to read first image data from the storage unit, wherein the image data stored by the storage unit is divided into a plurality of the first image data in the main scanning direction and the sub-scanning direction;
    an image processing unit configured to execute predetermined image processing based on the first image data and first image data adjacent to the first image data in the sub-scanning direction;
    an extraction unit configured to extract, based on information about a deflection of the carriage shaft in the sub-scanning direction, second image data from the first image data for which said image processing unit has executed the image processing;
    a transfer unit configured to transfer the second image data extracted by said extraction unit to the print head; and
    a memory configured to hold a table for defining the information about the deflection,
    wherein the information about the deflection defined in the table is defined independently for each of first image data of a plurality of color components.

2. The apparatus according to claim 1, wherein a size of the first image data in the main scanning direction is 1 column or N columns where N is a positive integer not less than 2.

3. The apparatus according to claim 1, wherein the information about the deflection defined in the table is indicated by an absolute amount for reference first image data in the main scanning direction, and is indicated by a relative amount with respect to the information about the deflection of immediately preceding first image data for first image data other than the reference first image data in the main scanning direction.

4. The apparatus according to claim 1, wherein the information about the deflection defined in the table is indicated by an absolute amount for each first image data in the main scanning direction.

5. The apparatus according to claim 1, wherein as the information about the deflection defined in the table, a relative amount with respect to a value defined for a reference column and a reference color of the image data of the plurality of color components is defined for each first image data.

6. The apparatus according to claim 1, wherein the information about the deflection defined in the table is defined based on a first column number and a second column number, which is different from the first column number in the main scan direction.

7. A printing method executed by a printing apparatus which includes a movement unit for moving a carriage incorporating a print head along a carriage shaft arranged in a main scanning direction, and a conveyance unit for conveying a printing medium in a sub-scanning direction perpendicular to the main scanning direction, the method comprising:
    a storage step of storing first image data corresponding to each of a plurality of regions obtained by dividing image data in the main scanning direction and the sub-scanning direction;
    a reading step of reading first image data stored in the storage step, wherein the image data stored in the storage step is divided into a plurality of the first image data in the main scanning direction and the sub-scanning direction;
    an image processing step of executing predetermined image processing based on the first image data and first image data adjacent to the first image data in the sub-scanning direction;
    an extraction step of extracting, based on information about a deflection of the carriage shaft in the sub-scanning direction, second image data from the first image data for which the image processing has been executed in the image processing step;
    a transfer step of transferring the second image data extracted in the extraction step to the print head; and
    providing a table for defining the information about the deflection,
    wherein the information about the deflection defined in the table is defined independently for each of first image data of a plurality of color components.

8. The method according to claim 7, wherein a size of the first image data in the main scanning direction is 1 column or N columns where N is a positive integer not less than 2.

9. The method according to claim 7, wherein the information about the deflection defined in the table is indicated by an absolute amount for reference first image data in the main scanning direction, and is indicated by a relative amount with respect to the information about the deflection of an immediately preceding first image data for first image data other than the reference first image data in the main scanning direction.

10. The method according to claim 7, wherein the information about the deflection defined in the table is indicated by an absolute amount for each first image data in the main scanning direction.

11. The method according to claim 7, wherein as the information about the deflection defined in the table, a relative amount with respect to a value defined for a reference column and a reference color of the image data of the plurality of color components is defined for each first image data.

12. The method according to claim 7, wherein the information about the deflection defined in the table is defined based on a first column number and a second column number, which is different from the first column number in the main scan direction.

* * * * *